US012766716B1

(12) United States Patent
Rakshit et al.

(10) Patent No.: US 12,766,716 B1
(45) Date of Patent: Oct. 20, 2026

(54) CONFIGURATION OF ROBOTS TO EXECUTE AN ACTIVITY

(71) Applicant: International Business Machines Corporation, Armonk, NY (US)

(72) Inventors: Sarbajit Kumar Rakshit, Kolkata (IN); Sudheesh S. Kairali, Kozhikode (IN); Binoy Thomas, Kozhikode (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/201,144

(22) Filed: May 7, 2025

(51) Int. Cl.
*B25J 9/16* (2006.01)

(52) U.S. Cl.
CPC ............ *B25J 9/1653* (2013.01); *B25J 9/161* (2013.01); *B25J 9/163* (2013.01); *B25J 9/1664* (2013.01); *B25J 9/1671* (2013.01); *B25J 9/1682* (2013.01)

(58) Field of Classification Search
CPC . B25J 9/1653; B25J 9/161; B25J 9/163; B25J 9/1664; B25J 9/1671; B25J 9/1682; B25J 9/1666; B25J 9/1669; B25J 9/1674; B25J 9/1676; B25J 9/1605; B25J 9/0084; B25J 9/08; B25J 9/1617; G05D 1/617; G05D 1/639; G05D 1/622; G05D 1/0027; G05D 1/69; G05D 1/693; G05D 2101/10; G05B 2219/39146; G05B 2219/40515; G05B 2219/39135; G05B 19/41845; G05B 2219/40302; G05B 2219/40274
See application file for complete search history.

(56) References Cited

U.S. PATENT DOCUMENTS

| | | | |
|---|---|---|---|
| 2017/0057081 A1 | 3/2017 | Krohne et al. | |
| 2020/0101611 A1 | 4/2020 | Ramanujam et al. | |
| 2021/0046639 A1* | 2/2021 | Ravi ...................... | B25J 11/005 |

FOREIGN PATENT DOCUMENTS

| | | |
|---|---|---|
| CN | 115196043 A | 10/2022 |
| CN | 114995182 B | 3/2023 |
| CN | 119923632 A | 5/2025 |

OTHER PUBLICATIONS

Simulation and analysis.pdf (Andrew Jones and Jeremy Straub, Simulation and Analysis of Self-Replicating Robot Decision-Making Systems, 2021, MPDI https://doi.org/10.3390/computers1001000, pp. 1-28) (Year: 2021).*

(Continued)

*Primary Examiner* — Bao T Nguyen
(74) *Attorney, Agent, or Firm* — CHIP LAW GROUP

(57) ABSTRACT

Configuration of robots to execute an activity includes receiving activity data associated with at least one activity to be executed in an activity area. A plurality of activity parameters are determined based on the activity data. One or more robotic parameters associated with a plurality of robots are obtained. A set of robots from the plurality of robots is selected based on the plurality of activity parameters and the one or more robotic parameters. One or more vulnerabilities associated with the set of robots are predicted. One or more modifications are determined based on the one or more vulnerabilities. A modification command is generated to control the one or more modifications in the set of robots. The modified set of robots is configured to execute the at least one activity. The modified set of robots is controlled based on the configuration of the modified set of robots.

20 Claims, 9 Drawing Sheets

(56) References Cited

OTHER PUBLICATIONS

Abdel-Rahman et al., "Self-Replicating Hierarchical Modular Robotic Swarms", Communications Engineering, Nov. 22, 2022, pp. 1-10.
Ashitava Ghosal "Resolution of Redundancy in Robots and in a Human Arm", Jan. 2018, pp. 1-15.
IBM, "How IBM will Build the World's First Large-Scale, Fault-Tolerant Quantum Computer", Think, Tech news, education and events, Jun. 10, 2025, pp. 1-6.
IBM, "Maximo Asset Inspection", Asset Inspection, Jun. 13, 2025, pp. 1-5.
IBM, "What is Robotic Process Automation (RPA)?", Business Automation, Sep. 22, 2021, pp. 1-4.
Jones et al., "Concepts for 3D Printing-Based Self-Replicating Robot Command and Coordination Techniques", Machines, Apr. 6, 2017, 21 Pages.
Jones et al., "Simulation and Analysis of Self-Replicating Robot Decision-Making Systems", Computers, Jan. 6, 2021, 28 Pages.
Li et al., "A Dynamic Shape-Shifting Method for a Transformable Tracked Robot", Mar. 3, 2011, 2010 IEEE International Conference on Robotics and Biomimetics, pp. 466-471.
No Author, "Question: For the Planar 3R Robot Shown in Fig. 1. Perform a Forward Dynamic Simulation for 1.0 Seconds. The Desired Motion Starts from Rest with Applied", Chegg, Jun. 13, 2025, pp. 1-2.
RobotPark "Kinematics Modular Robotic Building Blocks 81010", Kinematics Construction Kit, Aug. 17, 2013, pp. 1-5.
Shah et al., "A Soft Robot that Adapts to Environments Through Shape Change", The definitive version of this article was published in Nature Machine Intelligence (2020), Jan. 9, 2023, pp. 1-34.
Song et al., "Mechanism Design and Analysis of a Proposed Wheelchair-Exoskeleton Hybrid Robot for Assisting Human Movement", Jan. 7, 2019, pp. 11-24.
Suzuki et al., "ShapeBots: Shape-Changing Swarm Robots", Sep. 8, 2019, pp. 1-13.
International Searching Authority, "Notification of Transmittal of the International Search Report and the Written Opinion of the International Searching Authority, or Declaration," Patent Cooperation Treaty, Jul. 21, 2026, 16 pages, International Application No. PCT/EP2026/061077.

* cited by examiner

400

CONFIGURATION OF ROBOTS TO EXECUTE AN ACTIVITY

BACKGROUND

The disclosure relates to robotic systems and more particularly, to configuring robotic systems.

With rapid advancements in technology, use of robotic systems has become increasingly prevalent in various industries and fields. The robotic systems are equipped with multiple sensors, Artificial Intelligence (AI), and advanced mechanical capabilities to enhance task performance and increase cost effectiveness of executing tasks by the robotic systems. Further, the key reason for the increased use of the robotic systems is the ability of the robotic systems to perform multiple tasks that are either too dangerous or too monotonous for humans. For example, the robotic system may be used in multiple industries, such as construction, agriculture, or manufacturing for performing multiple tasks, which may include heavy lifting, welding, or repetitive assembly line work. Performance of the multiple tasks via the robotic systems reduces the risk of injuries to human workers and saves time and effort of the human workers.

SUMMARY

In various embodiments of the disclosure, a computer-implemented method for configuration of robots to execute an activity is described. The computer-implemented method includes receiving, by a computer, activity data associated with at least one activity to be executed in an activity area. The computer-implemented method further includes determining, by the computer, a plurality of activity parameters associated with the at least one activity based on the activity data. The computer-implemented method further includes obtaining, by the computer, one or more robotic parameters associated with each robot of a plurality of robots. The computer-implemented method further includes selecting, by the computer, a set of robots from the plurality of robots based on the plurality of activity parameters and the one or more robotic parameters. The computer-implemented method further includes predicting, by the computer, one or more vulnerabilities associated with an execution of the at least one activity by the set of robots. The one or more vulnerabilities are predicted based on the one or more robotic parameters and the plurality of activity parameters. The computer-implemented method further includes determining, by the computer, one or more modifications based on the one or more vulnerabilities. The one or more modifications are performed in the set of robots. The computer-implemented method further includes generating, by the computer, a modification command indicative of the one or more modifications to be performed by the set of robots. The computer-implemented method further includes controlling, by the computer, the one or more modifications in the set of robots based on the generated modification command. The computer-implemented method further includes configuring, by the computer, the modified set of robots to execute the at least one activity. The computer-implemented method further includes controlling, by the computer, the modified set of robots based on the configuration of the modified set of robots. The modified set of robots is controlled to execute the at least one activity.

In various embodiments of the disclosure, a computer system for configuration of robots to execute an activity is described. The computer system includes a processor set, one or more computer-readable storage media, and program instructions stored on the one or more computer-readable storage media. The program instructions are executable by the processor set and cause the processor set to receive activity data associated with at least one activity to be executed in an activity area. The program instructions further cause the processor set to determine a plurality of activity parameters associated with the at least one activity based on the activity data. The program instructions further cause the processor set to obtain one or more robotic parameters associated with each robot of a plurality of robots. The program instructions further cause the processor set to select a set of robots from the plurality of robots based on the plurality of activity parameters and the one or more robotic parameters. The program instructions further cause the processor set to predict one or more vulnerabilities associated with an execution of the at least one activity by the set of robots. The one or more vulnerabilities are predicted based on the one or more robotic parameters and the plurality of activity parameters. The program instructions further cause the processor set to determine one or more modifications based on the one or more vulnerabilities. The one or more modifications are performed in the set of robots. The program instructions further cause the processor set to execute a modification command indicative of the one or more modifications to be performed by the set of robots. The program instructions further cause the processor set to control the one or more modifications in the set of robots based on the executed modification command. The program instructions further cause the processor set to configure the modified set of robots to execute the at least one activity. The program instructions further cause the processor set to control the modified set of robots based on the configuration of the modified set of robots. The modified set of robots is controlled to execute the at least one activity.

In various embodiments of the disclosure, a computer-program product for configuration of robots to execute an activity is described. The computer-program product includes one or more computer-readable storage media and program instructions stored on the one or more computer-readable storage media.

Additional technical features and benefits are realized through the processes of the disclosure. Embodiments and aspects of the disclosure are described in detail herein and are considered a part of the claimed subject matter. For a better understanding, refer to the detailed description and the drawings.

BRIEF DESCRIPTION OF THE DRAWINGS

The following description will provide details of preferred embodiments with reference to the following figures wherein.

DETAILED DESCRIPTION

Figure 1:
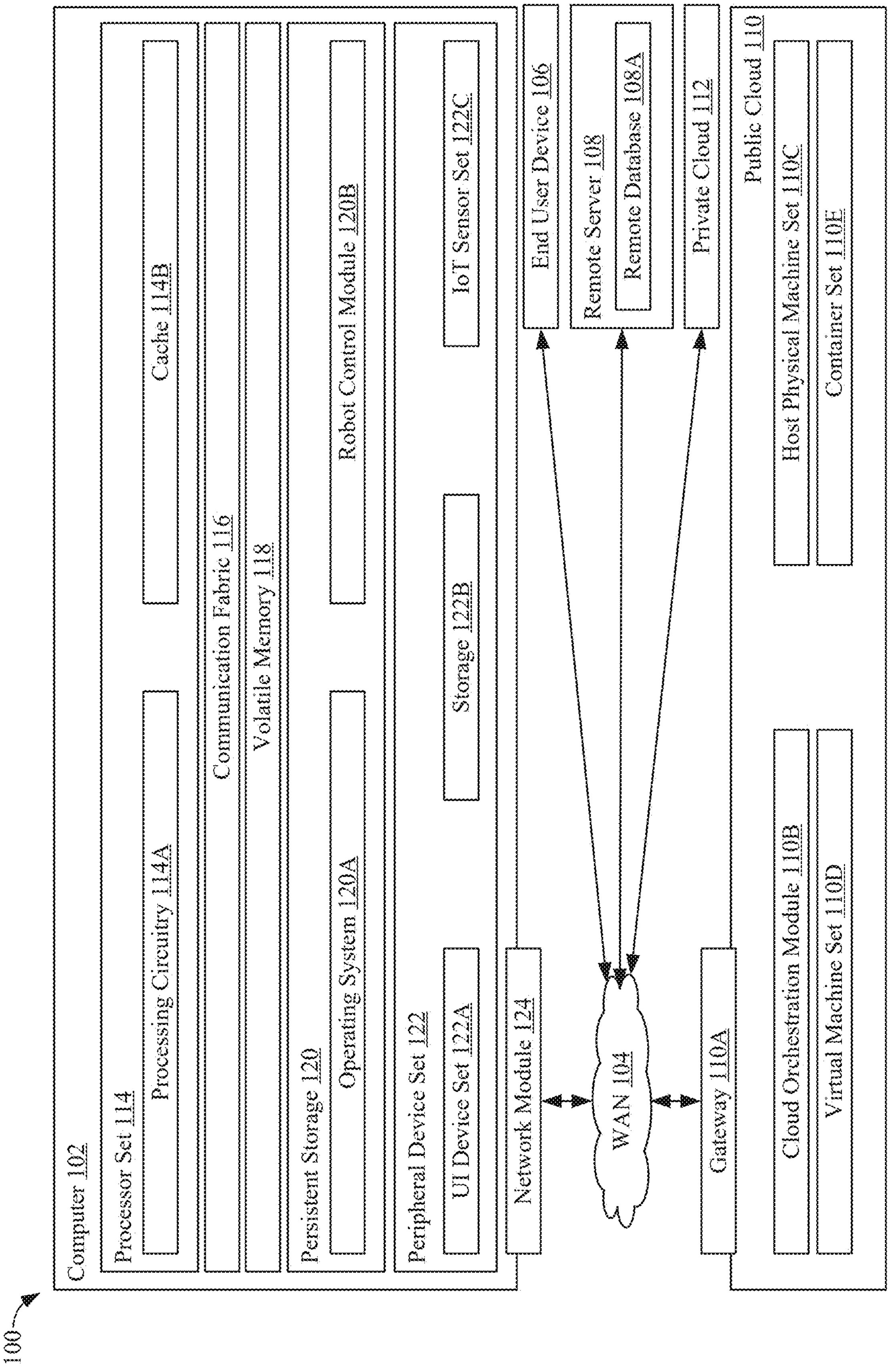
FIG. 1 is a diagram that illustrates a computing environment for configuration of robots to execute an activity, in accordance with an embodiment of the disclosure.

In modern industrial settings, execution of complex activities requires collaborative involvement of multiple robots. Robot-based industrial activity execution represents a paradigm shift in manufacturing and automation. Multiple robots, each specialized in distinct tasks such as (but not limited to) welding, assembly, or material handling work in tandem to achieve a seamless and efficient workflow. The robots, equipped with diverse end-effectors and functionalities, achieve versatility and precision in production. Integration of multiple robotic systems requires meticulous planning, considering factors such as (but not limited to) task allocation, communication protocols, or real-time monitoring. Synchronized efforts of the multiple robotic systems contribute to increased productivity, faster task completion, and enhanced overall operational efficiency. Integration of the multiple robotic systems improves industrial processes as well as opens doors to a new era of flexible and adaptive manufacturing systems.

Further, the robotic systems are designed with mobility capabilities to perform a certain task. However, the mobility capabilities may prevent the robotic systems from reaching certain areas that are inaccessible or difficult to navigate, thus posing a challenge in performing certain activities. For example, the robotic system needs to collect dirt samples from a mining site, but the robotic system may not be able to traverse rough terrain, maneuver around obstacles such as debris or walls, or climb stairs. As a result, there may be limitations on locations and points of interest that the robotic systems can reach, thereby limiting the effectiveness of the robotic systems in certain scenarios.

Current robotic systems available in the market are characterized by restricted mobility when performing operational tasks. Further, the current robotic systems are designed to operate within specific environments or spaces, such as hospital rooms, factory floors, or outdoor fields. Thus, the mobility of the current robotic systems is often restricted to the predefined areas due to limitations in navigation capabilities, terrain adaptability, or operational constraints. While the current robotic systems can navigate autonomously, the current robotic systems require clear paths or structured environments to move efficiently. Further, the current robotic systems may include sensors to detect obstacles. However, navigating complex or dynamic environments (e.g., rough terrain, or crowded spaces) can be challenging and may limit mobility of the current robotic systems. The current robotic systems have limited dynamic adaptability to changes or unforeseen circumstances while performing the operational tasks. As a result, the current robotic systems may not be able to readily adjust the operational tasks in response to new information or environmental changes during operation. For example, a robot designed for manufacturing tasks may struggle to handle unexpected variations in a production process or an environment for the manufacturing tasks, resulting in delays or errors.

In some instances, the robotic systems may need custom modifications to configure the robotic systems to perform the certain task, as the robotic systems may not meet criteria to perform the certain task. Thus, there is a need for an automated system that can enable the configuration of the robotic systems to perform the tasks by the configured set of robots.

The disclosed system utilizes a virtual simulation of a plurality of robots, which enables the disclosed system to reduce overall processing time in selecting a set of robots that execute at least one activity in an activity area. Instead of selecting the set of robots based on a plurality of activity parameters and one or more robotic parameters of each robot of the plurality of robots, the disclosed system simulates the virtual representation of the plurality of robots based on the one or more robotic parameters and the plurality of activity parameters. The disclosed system simulates the execution of the at least one activity in the activity area by the set of robots. The simulation of different robot combinations of the set of robots enables the disclosed system to select the set of robots fit for executing the at least one activity.

In various embodiments of the disclosure, a computer-implemented method for configuration of robots to execute an activity is described. The computer-implemented method includes receiving, by a computer, activity data associated with at least one activity to be executed in an activity area. The computer-implemented method further includes determining, by the computer, a plurality of activity parameters associated with the at least one activity based on the activity data. The computer-implemented method further includes obtaining, by the computer, one or more robotic parameters associated with each robot of a plurality of robots. The computer-implemented method further includes selecting, by the computer, a set of robots from the plurality of robots based on the plurality of activity parameters and the one or more robotic parameters. The computer-implemented method further includes predicting, by the computer, one or more vulnerabilities associated with an execution of the at least one activity by the set of robots. The one or more vulnerabilities are predicted based on the one or more robotic parameters and the plurality of activity parameters. The computer-implemented method further includes determining, by the computer, one or more modifications based on the one or more vulnerabilities. The one or more modifications are performed in the set of robots. The computer-implemented method further includes generating, by the computer, a modification command indicative of the one or more modifications to be performed by the set of robots. The computer-implemented method further includes controlling, by the computer, the one or more modifications in the set of robots based on the generated modification command. The computer-implemented method further includes configuring, by the computer, the modified set of robots to execute the at least one activity. The computer-implemented method further includes controlling, by the computer, the modified set of robots based on the configuration of the modified set of robots. The modified set of robots is controlled to execute the at least one activity.

The disclosed system utilizes the activity data, the plurality of activity parameters, and the one or more robotic parameters to select the set of robots, which improve accuracy in selecting the set of robots. An increase in the accuracy of selecting the set of robots increases an overall possibility of the set of robots to execute the at least one activity in the activity area. The disclosed system generates the modification command to perform the one or more modifications by the set of robots which improves an overall structural integrity of the set of robots, further reducing possibilities of failure (or breakdown) of the set of robots, while executing the at least one activity.

In various embodiments of the disclosure, the computer implemented method further includes controlling, by the computer, one or more sensors to capture the activity data associated with the activity area. The computer implemented method further includes receiving, by the computer, the activity data associated with the activity area from the one or more sensors.

The disclosed system controls the one or more sensors to capture the activity data associated with the activity area. The disclosed system captures and monitors the activity in real-time, which improves decision-making process by taking immediate action in case of any problems. For example, in case the one or more sensors capture dust levels in a mining site greater than a threshold, which is not safe for human breathing, the disclosed system generates an alert indicative of a hazardous environment in the mining site for operating mining activities (e.g., mining coal). The generation of the alert improves the safety and overall decision-making process of the disclosed system.

In various embodiments of the disclosure, the activity data includes at least one of surface data associated with a surface of the activity area, activity specification data associated with the at least one activity, or environmental data associated with an environment of the activity area.

The disclosed system utilizes the surface data associated with the surface of the activity area to generate three-dimensional (3D) models of the activity area. The utilization of 3D models improves navigation planning for the set of robots to navigate in the activity area and execute the at least one activity. The disclosed system utilizes the activity specification data associated with the at least one activity to improve allocation of resources for executing the at least one activity in the activity area. The disclosed system determines the set of robots based on the activity specification data and determines robots that are fit to execute the at least one activity. The disclosed system utilizes environmental data associated with the environment of the activity area to analyze environmental conditions in which the set of robots executes the at least one activity in the activity area. The assessment of the environmental conditions is executed to determine impact of fluctuating environmental conditions on performance of the set of robots.

In various embodiments of the disclosure, the computer implemented method further includes applying, by the computer, a first artificial intelligence (AI) model to the plurality of activity parameters and the one or more robotic parameters to generate a virtual representation of the plurality of robots. The computer implemented method further includes simulating, by the computer, the virtual representation of the plurality of robots. The computer implemented method further includes generating, by the computer, a simulation result based on the simulation of the virtual representation of the plurality of robots.

The disclosed system utilizes the first AI model to generate the virtual representation of the plurality of robots. The virtual representation of the plurality of robots is simulated to visualize each robot of the plurality of robots in a 3D model of the activity area. The simulation is further utilized to determine the simulation result which is further used to determine the set of robots. The disclosed system utilizes the simulation to test possible combinations between robots of the plurality of robots, impacts of fluctuations in environmental conditions in execution of the at least one activity without any real-life consequences, which decreases real-life possibilities of failure in execution of the at least one activity.

In various embodiments of the disclosure, the computer implemented method further includes selecting, by the computer, the set of robots based on the simulation result. The simulation result indicates that the set of robots executes the at least one activity in the activity area.

The disclosed system utilizes the simulation result to select the set of robots, which reduces the possibility of failure in executing the at least one activity as the disclosed system first simulates the set of robots in the 3D model of the activity area to evaluate if the set of robots executes the at least one activity. The selection based on the simulation result decreases the possibility of failure in executing the at least one activity by the set of robots.

In various embodiments of the disclosure, the computer implemented method further includes generating, by the computer, a fabrication command based on the simulation result. The fabrication command indicates a fabrication of a custom robot different from the plurality of robots. The computer implemented method further includes controlling, by the computer, a fabrication unit to fabricate the custom robot. The fabrication unit is controlled based on the fabrication command. The custom robot and the set of robots executes the at least one activity in the activity area. The computer implemented method further includes configuring, by the computer, the custom robot and the set of robots to execute the at least one activity.

In case the simulation result indicates that the set of robots does not execute the at least one activity, and fabrication of one or more custom robots may assist in the configuration of the set of robots. The disclosed system utilizes the simulation result to control the fabrication unit to fabricate the one or more custom robots to configure the set of robots. The fabrication of one or more custom robots to configure the set of robots enables dynamic execution of the at least one activity in the activity area.

In various embodiments of the disclosure, the computer implemented method further includes applying, by the computer, a second AI model to the one or more robotic parameters associated with each robot of the modified set of robots to determine one or more coupling parameters. The computer implemented method further includes generating, by the computer, a coupling command indicative of the configuration of the modified set of robots based on the determined one or more coupling parameters.

The disclosed system utilizes the second AI model to determine the one or more coupling parameters which improves the accuracy of coupling the modified set of robots. The increased accuracy improves reliability and resistance tolerance capacity of the coupled modified set of robots.

In various embodiments of the disclosure, the one or more coupling parameters include at least one of a degree of freedom of each robot of the modified set of robots, a type of movement of each robot of the modified set of robots, a range of motion in each joint of each robot of the modified set of robots, a flexibility in each joint of each robot of the modified set of robots, a position of each effector of each robot of the modified set of robots, or an orientation of each effector of each robot of the modified set of robots.

The disclosed system utilizes the one or more coupling parameters to generate the coupling command. The one or more coupling parameters indicate, by way of example, and not by limitation, a measure of mobility, flexibility, and range of motion of various parts of each robot of the set of robots. The one or more coupling parameters reduce errors/faults in the coupling command to couple the modified set of robots.

In various embodiments of the disclosure, the computer implemented method further includes applying, by the computer, a third AI model to the one or more robotic parameters associated with each robot of the modified set of robots to determine a trajectory for the modified set of robots. The computer implemented method further includes generating, by the computer, a trajectory command for the modified set of robots based on the determined trajectory. The trajectory command instructs the modified set of robots to follow the trajectory to execute the at least one activity. The computer implemented method further includes transmitting, by the computer, the trajectory command to the modified set of robots.

The disclosed system utilizes the third AI model to determine the trajectory of the modified set of robots which improves resource utilization efficiency of the modified set of robots by generating a trajectory path for the modified set of robots that reduces overall resource consumption (e.g., battery consumption by the modified set of robots to navigate in the activity area) by the modified set of robots. The disclosed system utilizes the third AI model to improve real-time decision-making in determining the trajectory of the modified set of robots. For example, the third AI model updates the trajectory of the modified set of robots in case the modified set of robots spots an obstacle in the path of the modified set of robots (e.g., presence of a rock in the path of the modified set of robots).

In various embodiments of the disclosure, the computer implemented method further includes identifying, by the computer, one or more robots from the set of robots based on the one or more vulnerabilities. The computer implemented method further includes determining, by the computer, the one or more modifications to be performed in the one or more robots for resolving the one or more vulnerabilities. The computer implemented method further includes generating, by the computer, the modification command for a modification of the one or more robots based on the determined one or more modifications.

The disclosed system determines the one or more modifications for resolving the one or more vulnerabilities in the one or more robots which reduces errors in configuration of the set of robots. In case the set of robots are configured without resolving the one or more vulnerabilities in the one or more robots of the set of robots, the configured set of robots may not be able to execute the activity. Therefore, the disclosed system generates the modification command to resolve the one or more vulnerabilities.

In various embodiments of the disclosure, the computer implemented method further includes controlling, by the computer, a fabrication unit based on the modification command to modify the one or more robots. The modification of the one or more robots corresponds to an inclusion of a portion of robotic material to at least one robot of the one or more robots. The computer implemented method further includes outputting, by the computer, the modified one or more robots based on the control of the fabrication unit.

The disclosed system utilizes the fabrication unit to modify the one or more robots. The fabrication unit modifies the one or more robots by incorporating the portion of the robotic material into the one or more robots, which by way of example, and not by limitation, improves mass distribution among the one or more robots, and improves coupling between surfaces of each robot of the one or more robots.

In various embodiments of the disclosure, the computer implemented method further includes controlling, by the computer, a fabrication unit based on the modification command to modify the one or more robots. The modification of the one or more robots corresponds to a removal of a portion of robotic material from at least one robot of the one or more robots. The computer implemented method further includes outputting, by the computer, the modified one or more robots based on the control of the fabrication unit.

The disclosed system utilizes the fabrication unit to modify the one or more robots. The fabrication unit modifies the one or more robots by removing the portion of the robotic material from the one or more robots, which by way of example, and not by limitation, improves mass distribution among the one or more robots, and improves navigation of the one or more robots by removing the portion of the robotic material from the one or more robots that cause a resistance in navigation of the one or more robots.

In various embodiments of the disclosure, the plurality of activity parameters includes at least one of a set of entities present within the activity area, a type of activity to be executed by the set of robots in the activity area, a plurality of activity specifications associated with the type of activity to be executed by the set of robots in the activity area, or a set of risk factors associated with the type of activity to be executed by the set of robots in the activity area.

The disclosed system utilizes the one or more activity parameters which improves the overall accuracy in determining the set of robots from the plurality of robots. An improved accuracy in determining the set of robots improves possibility of the set of robots to execute the at least one activity.

In various embodiments of the disclosure, the one or more robotic parameters include at least one of a count of actuators in each robot of the plurality of robots, a type of each actuator in each robot of the plurality of robots, a length of the actuators in each robot of the plurality of robots, a movement direction of the actuators in each robot of the plurality of robots, a count of joints in each robot of the plurality of robots, a type of each joint in each robot of the plurality of robots, a count of sensors in each robot of the plurality of robots, a type of each sensor in each robot of the plurality of robots, a distribution of mass within each robot of the plurality of robots, a count of movable components in each robot of the plurality of robots, or a count of immovable components in each robot of the plurality of robots.

The disclosed system utilizes the one or more robotic parameters which improves the overall accuracy in determining the set of robots from the plurality of robots. An improved accuracy in determining the set of robots improves possibility of the set of robots to execute the at least one activity.

In various embodiments of the disclosure, a computer system for configuration of robots to execute an activity is described. The computer system includes a processor set, one or more computer-readable storage media, and program instructions stored on the one or more computer-readable storage media. The program instructions are executable by the processor set and cause the processor set to receive activity data associated with at least one activity to be executed in an activity area. The program instructions further cause the processor set to determine a plurality of activity parameters associated with the at least one activity based on the activity data. The program instructions further cause the processor set to obtain one or more robotic parameters associated with each robot of a plurality of robots. The program instructions further cause the processor set to select a set of robots from the plurality of robots based on the plurality of activity parameters and the one or more robotic parameters. The program instructions further cause the processor set to predict one or more vulnerabilities associated with an execution of the at least one activity by the set of robots. The one or more vulnerabilities are predicted based on the one or more robotic parameters and the plurality of activity parameters. The program instructions further cause the processor set to determine one or more modifications based on the one or more vulnerabilities. The one or more modifications are performed in the set of robots. The program instructions further cause the processor set to execute a modification command indicative of the one or more modifications to be performed by the set of robots. The program instructions further cause the processor set to control the one or more modifications in the set of robots based on the executed modification command. The program instructions further cause the processor set to configure the modified set of robots to execute the at least one activity. The program instructions further cause the processor set to control the modified set of robots based on the configuration of the modified set of robots. The modified set of robots is controlled to execute the at least one activity.

The disclosed system utilizes the activity data, the plurality of activity parameters, and the one or more robotic parameters to select the set of robots which improves the accuracy in selecting the set of robots. An increase in the accuracy of selecting the set of robots increases an overall possibility of the set of robots to execute the at least one activity in the activity area. The disclosed system generates the modification command to perform the one or more modifications by the set of robots which improves the overall structural integrity of the set of robots, further reducing possibilities of failure (or breakdown) of the set of robots while executing the at least one activity.

In various embodiments of the disclosure, the program instructions further cause the processor set to apply a first artificial intelligence (AI) model to the plurality of activity parameters and the one or more robotic parameters to execute a virtual representation of the plurality of robots. The program instructions further cause the processor set to simulate the virtual representation of the plurality of robots. The program instructions further cause the processor set to execute a simulation result based on the simulation of the virtual representation of the plurality of robots.

The disclosed system utilizes the first AI model to generate the virtual representation of the plurality of robots. The virtual representation of the plurality of robots is simulated to visualize each robot of the plurality of robots in a 3D model of the activity area. The simulation is further utilized to determine the simulation result which is further used to determine the set of robots. The disclosed system utilizes the simulation to test possible combinations between robots of the plurality of robots, impacts of fluctuations in environmental conditions in execution of the at least one activity without any real-life consequences, which decreases real-life possibilities of failure in execution of the at least one activity.

In various embodiments of the disclosure, the program instructions further cause the processor set to select the set of robots based on the simulation result. The simulation result indicates that the set of robots executes the at least one activity in the activity area.

The disclosed system utilizes the simulation result to select the set of robots which reduces the possibility of failure in executing the at least one activity as the disclosed system first simulates the set of robots in the 3D model of the activity area to evaluate if the set of robots executes the at least one activity. The selection based on the simulation result decreases the possibility of failure in executing the at least one activity by the set of robots.

In various embodiments of the disclosure, the program instructions further cause the processor set to determine one or more coupling parameters for the modified set of robots based on the application of the first AI model to the one or more robotic parameters. The program instructions further cause the processor set to execute a coupling command indicative of the configuration of the modified set of robots based on the determined one or more coupling parameters.

The disclosed system utilizes the first AI model to determine the one or more coupling parameters which improves the accuracy of coupling the modified set of robots. The increased accuracy improves reliability and resistance tolerance capacity of the coupled modified set of robots.

In various embodiments of the disclosure, the program instructions further cause the processor set to determine a trajectory for the modified set of robots based on the application of the first AI model to the one or more robotic parameters. The program instructions further cause the processor set to execute a trajectory command for the modified set of robots based on the determined trajectory. The trajectory command instructs the modified set of robots to follow the trajectory to execute the at least one activity. The program instructions further cause the processor set to transmit the trajectory command to the modified set of robots.

The disclosed system utilizes the first AI model to determine the trajectory of the modified set of robots which improves resource utilization efficiency of the modified set of robots by generating a trajectory path for the modified set of robots that reduces overall resource consumption (e.g., battery consumption by the modified set of robots to navigate in the activity area) by the modified set of robots. The disclosed system utilizes the third AI model to improve real-time decision-making in determining the trajectory of the modified set of robots. For example, the third AI model updates the trajectory of the modified set of robots in case the modified set of robots spots an obstacle in the path of the modified set of robots (e.g., presence of a rock in the path of the modified set of robots).

In various embodiments of the disclosure, a computer-program product for configuration of robots to execute an activity is described. The computer program product includes one or more computer-readable storage media and program instructions stored in the one or more computer-readable storage media to perform operations that include receiving activity data associated with at least one activity to be executed in an activity area. The operations further include determining a plurality of activity parameters associated with the at least one activity based on the activity data. The operations further include obtaining one or more robotic parameters associated with each robot of a plurality of robots. The operations further include selecting a set of robots from the plurality of robots based on the plurality of activity parameters and the one or more robotic parameters. The operations further include predicting one or more vulnerabilities associated with an execution of the at least one activity by the set of robots. The one or more vulnerabilities are predicted based on the one or more robotic parameters and the plurality of activity parameters. The operations further include determining one or more modifications based on the one or more vulnerabilities. The one or more modifications are performed in the set of robots. The operations further include generating a modification command indicative of the one or more modifications to be performed by the set of robots. The operations further include controlling the one or more modifications in the set of robots based on the generated modification command. The operations further include configuring the modified set of robots to execute the at least one activity. The operations further include controlling the modified set of robots based on the configuration of the modified set of robots. The modified set of robots is controlled to execute the at least one activity.

The disclosed system utilizes the activity data, the plurality of activity parameters, and the one or more robotic parameters to select the set of robots which improves the accuracy in selecting the set of robots. An increase in the accuracy of selecting the set of robots increases an overall possibility of the set of robots to execute the at least one activity in the activity area. The disclosed system generates the modification command to perform the one or more modifications by the set of robots which improves the overall structural integrity of the set of robots, further reducing possibilities of failure (or breakdown) of the set of robots while executing the at least one activity.

A computer program product embodiment ("CPP embodiment" or "CPP") is a term used in the disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage media is an electronic storage media, a magnetic storage media, an optical storage media, an electromagnetic storage media, a semiconductor storage media, a mechanical storage media, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage media or mediums, as that term is used in the disclosure, is not to be construed as storage in the form of transitory signals per se, such as radio waves or various freely propagating electromagnetic waves, electromagnetic waves propagating through a waveguide, light pulses passing through a fiber optic cable, electrical signals communicated through a wire, and/or various transmission media. As will be understood by those of skill in the art, data is typically moved at some occasional points in time during normal operations of a storage device, such as during access, de-fragmentation, or garbage collection, but this does not render the storage device as transitory because the data is not transitory while stored.

FIG. 1 is a diagram that illustrates a computing environment for configuration of robots to execute an activity, in accordance with an embodiment of the disclosure. With reference to FIG. 1, there is shown a computing environment 100 that contains an example of an environment for the execution of at least some of the computer code involved in performing the disclosed methods, such as a robot control module 120B. In addition to the robot control module 120B, computing environment 100 includes, for example, a computer 102, a wide area network (WAN) 104, an end user device (EUD) 106, a remote server 108, a public cloud 110, and a private cloud 112. In this embodiment of the disclosure, the computer 102 includes a processor set 114 (including a processing circuitry 114A and a cache 114B), a communication fabric 116, a volatile memory 118, a persistent storage 120 (including an operating system 120A and the robot control module 120B, as identified above), a peripheral device set 122 (including a user interface (UI) device set 122A, a storage 122B, and an Internet of Things (IoT) sensor set 122C), and a network module 124. The remote server 108 includes a remote database 108A. The public cloud 110 includes a gateway 110A, a cloud orchestration module 110B, a host physical machine set 110C, a virtual machine set 110D, and a container set 110E.

The computer 102 may take the form of a desktop computer, a laptop computer, a tablet computer, a smartphone, a smartwatch or a wearable computer, a mainframe computer, a quantum computer, or any various forms of a computer or a mobile device now known or to be developed in the future that can run a program, access a network or query a database, such as the remote database 108A. As is well understood in the art of computer technology, and depending upon the technology, the performance of a computer-implemented method may be distributed among multiple computers and/or between multiple locations. In this presentation of the computing environment 100, detailed discussion is focused on a single computer, specifically the computer 102, to keep the presentation as simple as possible. The computer 102 may be located in a cloud, even though not shown in a cloud in FIG. 1.

The processor set 114 includes one, or more, computer processors of any type now known or to be developed in the future. The processing circuitry 114A may be distributed over multiple packages, for example, multiple, coordinated integrated circuit chips. The processing circuitry 114A may implement multiple processor threads and/or multiple processor cores. The cache 114B is a memory that is located in the processor chip package(s) and is typically used for data or code that should be available for rapid access by the threads or cores running on the processor set 114. Cache memories are typically organized into multiple levels depending upon relative proximity to the processing circuitry 114A. Alternatively, some, or all, of the cache 114B for the processor set 114 may be located "off-chip." In some computing environments, the processor set 114 may be designed for working with qubits and performing quantum computing.

Computer readable program instructions are typically loaded onto the computer 102 to cause a series of operations to be performed by the processor set 114 of the computer 102 and thereby effect a computer-implemented method, such that the instructions thus executed will instantiate the methods specified in flowcharts and/or narrative descriptions of computer-implemented methods included in this document (collectively referred to as "the disclosed methods"). These computer-readable program instructions are stored in various types of computer-readable storage media, such as the cache 114B and the various storage media discussed below. The program instructions, and associated data, are accessed by the processor set 114 to control and direct the performance of the disclosed methods. In computing environment 100, at least some of the instructions for performing the disclosed methods may be stored in the dynamic modification of the robot control module 120B in persistent storage 120.

The communication fabric 116 is the signal conduction path that allows the various components of the computer 102 to communicate with each other. Typically, this fabric is made of switches and electrically conductive paths, such as the switches and electrically conductive paths that make up buses, bridges, physical input/output ports, and the like. Various types of signal communication paths are used, such as fiber optic communication paths and/or wireless communication paths.

The volatile memory 118 is any type of volatile memory now known or to be developed in the future. Examples include dynamic type random access memory (RAM) or static type RAM. Typically, the volatile memory 118 is characterized by random access, but this is not needed unless affirmatively indicated. In the computer 102, the volatile memory 118 is located in a single package and is internal to the computer 102, but alternatively or additionally, the volatile memory 118 may be distributed over multiple packages and/or located externally with respect to the computer 102.

The persistent storage 120 is any form of non-volatile storage for computers that is now known or to be developed in the future. The non-volatility of this storage means that the stored data is maintained regardless of whether power is being supplied to the computer 102 and/or directly to the persistent storage 120. The persistent storage 120 is a read-only memory (ROM), but typically at least a portion of the persistent storage 120 allows the writing of data, deletion of data, and re-writing of data. Some familiar forms of the persistent storage 120 include magnetic disks and solid-state storage devices. The operating system 120A may take several forms, such as various known proprietary operating systems or open-source Portable Operating System Interface-type operating systems that employ a kernel. The code included in the robot control module 120B typically includes at least some of the computer code involved in performing the disclosed methods.

The peripheral device set 122 includes the set of peripheral devices of the computer 102. Data communication connections between the peripheral devices and the various components of the computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments of the disclosure, the UI device set 122A includes components such as a display screen, speaker, microphone, wearable devices (such as goggles and smartwatches), keyboard, mouse, printer, touchpad, game controllers, and haptic devices. The storage 122B is external storage, such as an external hard drive, or insertable storage, such as an SD card. The storage 122B is persistent and/or volatile. In some embodiments of the disclosure, the storage 122B may take the form of a quantum computing storage device for storing data in the form of qubits. In embodiments of the disclosure where the computer 102 is needed to have a large amount of storage (for example, where the computer 102 locally stores and manages a large database) then this storage may be provided by peripheral storage devices designed for storing very large amounts of data, such as a storage area network (SAN) that is shared by multiple, geographically distributed computers. The IoT sensor set 122C is made up of sensors that can be used in Internet of Things applications. For example, a first sensor may be a thermometer, and a second sensor may be a motion detector.

The network module 124 is the collection of computer software, hardware, and firmware that allows the computer 102 to communicate with various computers through the WAN 104. The network module 124 may include hardware, such as modems or Wi-Fi signal transceivers, software for packetizing and/or de-packetizing data for communication network transmission, and/or web browser software for communicating data over the internet. In some embodiments of the disclosure, network control functions, and network forwarding functions of the network module 124 are performed on the same physical hardware device. In various embodiments of the disclosure (for example, embodiments that utilize software-defined networking (SDN)), the control functions and the forwarding functions of the network module 124 are performed on physically separate devices, such that the control functions manage several different network hardware devices. Computer-readable program instructions for performing the disclosed methods can typically be downloaded to the computer 102 from an external computer or external storage device through a network adapter card or network interface included in the network module 124.

The WAN 104 is any wide area network (for example, the internet) for communicating computer data over non-local distances by any technology for communicating computer data, now known or to be developed in the future. In some embodiments of the disclosure, the WAN 104 may be replaced and/or supplemented by local area networks (LANs) designed to communicate data between devices located in a local area, such as a Wi-Fi network. The WAN 104 and/or LANs typically include computer hardware such as copper transmission cables, optical transmission fibers, wireless transmission, routers, firewalls, switches, gateway computers, and edge servers.

The EUD 106 is any computer system that is used and controlled by an end user (for example, a customer of an enterprise that operates the computer 102) and may take any of the forms discussed above in connection with the computer 102. The EUD 106 typically receives helpful and useful data from the operations of the computer 102. For example, in a hypothetical case where the computer 102 is designed to provide a recommendation to an end user, this recommendation would typically be communicated from the network module 124 of the computer 102 through the WAN 104 to the EUD 106. In this way, the EUD 106 can display, or otherwise present recommendations to an end user. In some embodiments of the disclosure, the EUD 106 may be a client device, such as a mainframe computer, desktop computer, and so on.

The remote server 108 is any computer system that serves at least some data and/or functionality to the computer 102. The remote server 108 may be controlled and used by the same entity that operates the computer 102. The remote server 108 represents the machine(s) that collect and store helpful and useful data for use by various computers, such as the computer 102. For example, in a hypothetical case where the computer 102 is designed and programmed to provide a recommendation based on historical data, then this historical data may be provided to the computer 102 from the remote database 108A of the remote server 108.

The public cloud 110 is any computer system available for use by multiple entities that provides on-demand availability of computer system resources and/or various computer capabilities, especially data storage (cloud storage) and computing power, without direct active management by the user. Cloud computing typically leverages the sharing of resources to achieve coherence and economies of scale. The direct and active management of the computing resources of the public cloud 110 is performed by the computer hardware and/or software of the cloud orchestration module 110B. The computing resources provided by the public cloud 110 are typically implemented by virtual computing environments that run on various computers making up the computers of the host physical machine set 110C, which is the universe of physical computers in and/or available to the public cloud 110. The virtual computing environments (VCEs) typically take the form of virtual machines from the virtual machine set 110D and/or containers from the container set 110E. It is understood that these VCEs may be stored as images and may be transferred among and between the various physical machine hosts, either as images or after the instantiation of the VCE. The cloud orchestration module 110B manages the transfer and storage of images, deploys new instantiations of VCEs, and manages active instantiations of VCE deployments. The gateway 110A is the collection of computer software, hardware, and firmware that allows the public cloud 110 to communicate through the WAN 104.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in the containers. A computer program running on an ordinary operating system can utilize the resources of that computer, such as connected devices, files and folders, network shares, CPU power, and quantifiable hardware capabilities. However, programs running inside a container can only use the contents of the container and devices assigned to the container, a feature which is known as containerization.

The private cloud 112 is similar to the public cloud 110, except that the computing resources are only available for use by a single enterprise. While the private cloud 112 is shown as being in communication with the WAN 104, in various embodiments of the disclosure, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment of the disclosure, the public cloud 110 and the private cloud 112 are both part of a larger hybrid cloud.

Figure 2:
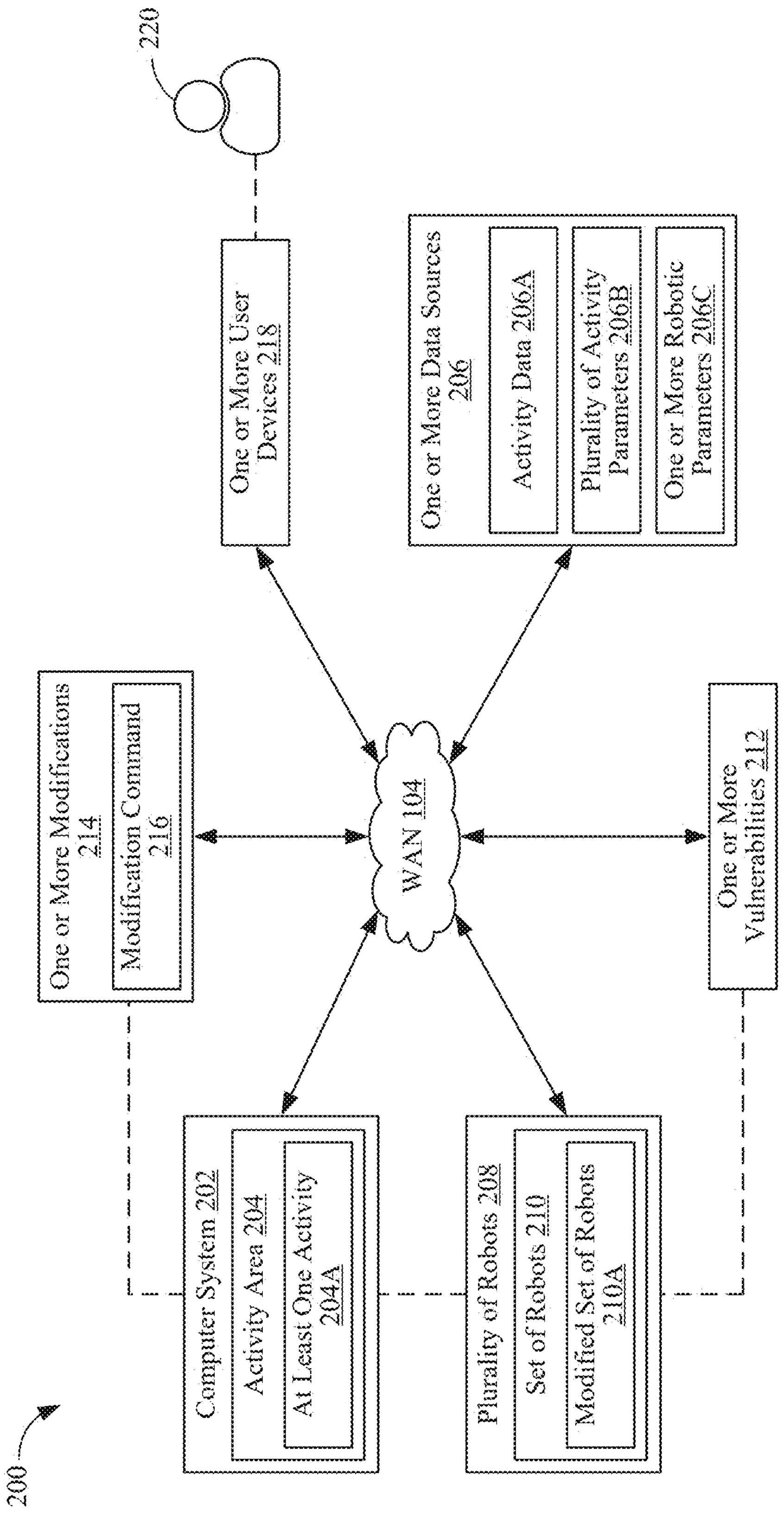
FIG. 2 is a diagram that illustrates a network environment for configuration of robots to execute an activity, in accordance with an embodiment of the disclosure.

FIG. 2 is a diagram that illustrates a network environment 200 for configuration of robots to execute an activity, in accordance with an embodiment of the disclosure. FIG. 2 is explained in conjunction with elements from FIG. 1. The network environment 200 includes a computer system 202, one or more data sources 206, a plurality of robots 208, one or more vulnerabilities 212, and one or more modifications 214. The computer system 202 includes an activity area 204. At least one activity 204A is performed in the activity area 204. The one or more data sources 206 include at least activity data 206A associated with the at least one activity 204A, a plurality of activity parameters 206B, and one or more robotic parameters 206C. The plurality of robots 208 include a set of robots 210. A modification command 216 is associated with resolution of the one or more modifications 214. A modified set of robots 210A is configured based on the one or more modifications performed in the set of robots 210 according to the modification command 216. The network environment 200 further includes one or more user devices 218, and a user 220 associated with the one or more user devices 218. The network environment 200 further includes the WAN 104 of FIG. 1. In an embodiment, each user device of the one or more user devices 218 is an exemplary embodiment of the EUD 106 of FIG. 1. The computer system 202 is an exemplary embodiment of the computer 102 in FIG. 1.

The computer system 202 receives the activity data 206A associated with the at least one activity 204A to be performed in the activity area 204 and determines the plurality of activity parameters 206B based on the activity data 206A. The plurality of activity parameters 206B are associated with the at least one activity 204A to be performed in the activity area 204. Furthermore, the computer system 202 obtains the one or more robotic parameters 206C associated with each robot of the plurality of robots 208 based on the plurality of activity parameters 206B and the one or more robotic parameters 206C. Thereafter, the computer system 202 selects the set of robots 210 from the plurality of robots 208 based on the plurality of activity parameters 206B and the one or more robotic parameters 206C. Furthermore, the computer system 202 predicts the one or more vulnerabilities 212 associated with an execution of the at least one activity 204A by the set of robots 210. The one or more vulnerabilities 212 are predicted based on the plurality of activity parameters 206B and the one or more robotic parameters 206C. Thereafter, the computer system 202 determines the one or more modifications 214 to be performed in the set of robots 210 based on the one or more vulnerabilities 212. The one or more modifications 214 are performed to resolve the one or more vulnerabilities 212 associated with the execution of the at least one activity 204A by the set of robots 210. Furthermore, the computer system 202 generates the modification command 216 indicative of the one or more modifications 214 to be performed by the set of robots 210. The computer system 202 further controls the set of robots 210 to perform the one or more modifications 214 in the set of robots 210 based on the modification command 216. Upon the modification of the set of robots 210, the computer system 202 configures the modified set of robots 210A to execute the at least one activity 204A. The computer system 202 further controls the modified set of robots 210A based on the configuration of the modified set of robots 210A. The modified set of robots 210A is configured to execute the at least one activity 204A in the activity area 204. Examples of the computer system 202 include but are not limited to, a server, a computing device, a virtual computing device, a mainframe machine, a computer workstation, an electronic control unit (ECU), or an electronic control module (ECM).

The activity area 204 is a defined spatial region within which a robotic system (e.g. the set of robots 210) executes the at least one activity 204A. The at least one activity 204A is a defined sequence of actions or operations executed collaboratively or independently by the set of robots 210 to achieve a specific objective or task (e.g., collecting dirt samples from a field). The at least one activity 204A may involve various functions such as sensing, manipulation, navigation, or communication, and is governed by algorithms, protocols, or control strategies that dictate behavior and interaction of the set of robots 210 with an environment within the activity area 204.

Each data source of the one or more data sources 206 corresponds to an organized collection of data that may be stored and accessed electronically from the computer system 202. Each of the one or more data sources 206 may be designed to manage, store, retrieve, and update data efficiently. In an embodiment, each data source of the one or more data sources 206 may correspond to a database. A structure of a database corresponding to each data source of the one or more data sources 206 may include tables, records, and fields that can be managed through a database management system (DBMS). In an embodiment of the disclosure, the one or more data sources 206 are configured to store the activity data 206A, the plurality of activity parameters 206B, and the one or more robotic parameters 206C. Examples of the one or more data sources 206 may include but are not limited to, a relational database, a Non-Structured Query Language (NoSQL) database, a hierarchical database, a network database, a transactional database, a data warehouse, or a distributed database.

The activity data 206A includes at least one of surface data associated with a surface of the activity area 204, activity specification data associated with the at least one activity 204A, or environmental data associated with the environment of the activity area 204. In an embodiment of the disclosure, the computer system 202 controls one or more sensors to capture the activity data 206A associated with the activity area 204. Examples of the one or more sensors may include, but not limited to, optical cameras, infrared cameras, LiDAR sensors, temperature sensors, humidity sensors, soil moisture sensors, air quality sensors, gas sensors, or motion sensors.

The surface data may include, but not limited to, a roughness of the surface of the activity area 204, an inclination of the surface of the activity area 204, slipperiness of the surface of the activity area 204, surface material of the surface of the activity area 204, or one or more obstacles present within the activity area 204. The roughness of the surface of the activity area 204 indicates a texture of the surface of the activity area 204, which affects traction and stability of the modified set of robots 210A while executing the at least one activity 204A in the activity area 204. The inclination of the surface of the activity area 204 indicates a slope of the surface of the activity area 204. The slipperiness of the surface of the activity area 204 indicates a measure of friction of the surface of the activity area 204 that impacts the traction of the modified set of robots 210A on the surface of the activity area 204. The surface material of the surface of the activity area 204 indicates a composition of the surface of the activity area 204. The surface material may include at least one of, by way of example, and not by limitation, asphalt, concrete, or dirt. Each obstacle of the one or more obstacles present within the activity area 204 indicates one of a natural or a man-made object that may hinder movement of the modified set of robots 210A on the surface of the activity area 204. In an embodiment, the computer system 202 utilizes an image segmentation process to determine the surface data associated with the surface of the activity area 204.

The activity specification data associated with the at least one activity 204A may include, but not limited to, an objective of the at least one activity 204A, one or more steps to be followed to execute the at least one activity 204A, one or more resources (personnel, equipment, or materials) that may assist in the execution of the at least one activity 204A, and a timeline of the at least one activity 204A. The objective of the at least one activity 204A indicates an outcome of the at least one activity 204A (for example, collection of dirt samples from a mining site). The timeline of the at least one activity 204A indicates a maximum duration that is identified for execution of the at least one activity 204A by the modified set of robots 210A. In an embodiment of the disclosure, the computer system 202 utilizes historical data associated with the execution of the at least one activity 204A to determine the activity specification data. The historical data includes a collection of records that contain information associated with execution of the at least one activity 204A over a specified period of time.

The environmental data associated with the environment of the activity area 204 may include, but not limited to a temperature value of the activity area 204, humidity levels in the activity area 204, atmospheric pressure in the activity area 204, light intensity in the activity area 204, or air quality (e.g., concentration of pollutants) in the activity area 204.

The plurality of activity parameters 206B includes at least one of a set of entities present within the activity area 204, a type of activity to be performed by the modified set of robots 210 in the activity area 204, a plurality of activity specifications associated with the type of activity to be performed by the modified set of robots 210A in the activity area 204, or a set of risk factors associated with the type of activity to be performed by the modified set of robots 210A in the activity area 204. The set of entities present within the activity area 204 may include, but not limited to machinery, buildings, trees, and obstacles. The type of activity may correspond to, by way of example, and not by limitation, manufacturing activity, construction activity, or monitoring activity. The plurality of activity specifications associated with the type of activity to be executed by the set of robots 210 in the activity area 204 indicate an objective associated with the type of the at least one activity 204A, one or more steps to be followed to execute the type of the at least one activity 204A, one or more resources (personnel, equipment, materials) that may assist in the execution of the type of the at least one activity 204A. The set of risk factors associated with the type of activity to be performed by the modified set of robots 210A in the activity area 204 may include, but not limited to, presence of obstacles in a path of the modified set of robots 210A, stress points present in connections of the modified set of robots 210A, or shortage of power that may assist in the execution of the at least one activity 204A. The stress points present in the connections of the modified set of robots 210A may breakdown under increased pressure.

The one or more robotic parameters 206C include at least one of a count and a type of actuators, a length and a movement direction of the actuators, a count and a type of joints, a count and a type of sensors, a count of movable components, and a count of immovable components in each robotic module of the plurality of robots 208. An actuator is a device that converts electrical energy into mechanical motion to enable a robot (e.g., a first robot of the plurality of robots 208) to perform specific tasks or movements (e.g., collecting dirt samples from a mining site).

Each robot of the plurality of robots 208 is a self-contained, reconfigurable unit that can operate independently or in conjunction with one or more robots to perform a variety of tasks. Each robot of the plurality of robots 208 may include a combination of mechanical components, sensors, actuators, and control systems that allow each robot of the plurality of robots 208 to execute specific functions such as locomotion, manipulation, or sensing. Each robot of the plurality of robots 208 may be physically connected or disconnected to form different configurations, enabling the different configurations of the plurality of robots 208 to adapt to diverse operational environments and tasks.

Each robot of the set of robots 210 is a self-contained, reconfigurable unit that can operate independently or in conjunction with each robot of the set of robots 210 to perform a variety of tasks. In an embodiment, the plurality of robots 208 include the set of robots 210.

The one or more vulnerabilities 212 predicted by the computer system 202 may include, by way of example, but not limited to, mechanical failure of joints and connectors present within the set of robots 210, or interference in mobility of the set of robots 210 due to rigid connections present within the set of robots 210. Examples of the one or more vulnerabilities 212 may further include load-bearing capacity of physical connections present within the set of robots 210, alignment issues present within the set of robots 210, or safety hazards from pinch points or sharp edges present within the set of robots 210.

The one or more modifications 214 determined by the computer system 202 to resolve the one or more vulnerabilities 212 may include, by way of example, but not limited to, modifying connections of joints and connectors associated with the set of robots 210, modifying load-bearing capacity of the physical connections present within the set of robots 210, applying protective coatings or seals to connectors present within the set of robots 210, or incorporating ergonomic features to eliminate pinch points and sharp edges present within the set of robots 210. The connections of the joints and the connectors associated with the set of robots 210 are modified by utilizing materials used in the construction of the set of robots 210.

The modification command 216 is indicative of a computer-implemented instruction that is generated by the computer system 202 to modify the set of robots 210 based on the one or more modifications 214. The computer system 202 is configured to modify one or more robots of the set of robots 210 based on the modification command 216.

Each user device of the one or more user devices 218 includes suitable logic, circuitry, or interfaces that are configured to execute one or more tasks within the network environment 200. Each user device of the one or more user devices 218 performs the one or more tasks such as receiving data, processing the data, and transmitting the data. Examples of each user device of the one or more user devices 218 may include, but not limited to, a smartphone, a cellular phone, a mobile phone, a consumer electronic (CE) device, an Internet of Things (IoT) device, a computing device, a mainframe machine, a server, or a computer workstation.

In operation, the computer system 202 receives the activity data 206A associated with the at least one activity 204A to be executed in the activity area 204. The activity data 206A includes the at least one of surface data associated with a surface of the activity area 204, activity specification data associated with the at least one activity 204A, or environmental data associated with the environment of the activity area 204.

Thereafter, the computer system 202 determines the plurality of activity parameters 206B associated with the at least one activity 204A based on the activity data 206A. Furthermore, the computer system 202 obtains the one or more robotic parameters 206C associated with each robot of the plurality of robots 208. The one or more robotic parameters 206C include at least one of a count and a type of actuators in each robotic module of the plurality of robots 208, a length and a movement direction of the actuators in each robot of the plurality of robots 208, a count and a type of joints in each robot of the plurality of robots 208, a count and a type of sensors in each robot of the plurality of robots 208, a distribution of mass within each robot of the plurality of robots 208, a count of movable components in each robot of the plurality of robots 208, and a count of immovable components in each robot of the plurality of robots 208. By way of example, the plurality of activity parameters 206B may indicate a collection of a coal sample from a coal mining site and further storage of the coal sample. The one or more robotic parameters 206C may include a ground clearance of at least 15 centimeters.

The computer system 202 selects the set of robots 210 from the plurality of robots 208 based on the plurality of activity parameters 206B and the one or more robotic parameters 206C. By way of example, and not by limitation, the plurality of robots 208 include robots X, Y, and Z. The computer system 202 selects the set of robots 210 which includes the robot X and the robot Z. The computer system 202 further predicts the one or more vulnerabilities 212 associated with an execution of the at least one activity 204A by the set of robots 210. The one or more vulnerabilities 212 are predicted based on the plurality of activity parameters 206B and the one or more robotic parameters 206C. In an embodiment, the computer system 202 identifies one or more robots from the set of robots 210 based on the one or more vulnerabilities 212. The computer system 202 determines one or more modifications in the one or more robots for resolving the one or more vulnerabilities 212. The computer system 202 generates the modification command 216 for modifying the one or more robots of the set of robots 210 based on the one or more modifications 214. The computer system 202 modifies the one or more robots based on the modification command 216. Details about modifying the one or more robots of the set of robots 210 are provided, in FIG. 3, and its corresponding description.

The computer system 202 further configures the modified set of robots 210A to perform the at least one activity 204A. The modified set of robots 210A includes the modified one or more robots and supplementary robots of the set of robots 210. The set of robots 210 is configured based on the modification command 216. Each robot of the set of robots 210 is coupled together based on the modification command to configure the modified set of robots 210A. Details about coupling the set of robots 210 to configure the modified set of robots 210A are provided, in FIG. 5.

In an embodiment of the disclosure, the computer system 202 determines a trajectory for the modified set of robots 210A based on the one or more robotic parameters 206C. The computer system 202 further generates a trajectory command for the modified set of robots 210A based on the determined trajectory. The trajectory command instructs the modified set of robots 210A to follow the trajectory to execute the at least one activity 204A. The computer system 202 further transmits the trajectory command to the modified set of robots 210A. Details about determining and transmitting the trajectory to the modified set of robots 210A are provided in FIG. 6.

Figure 3:
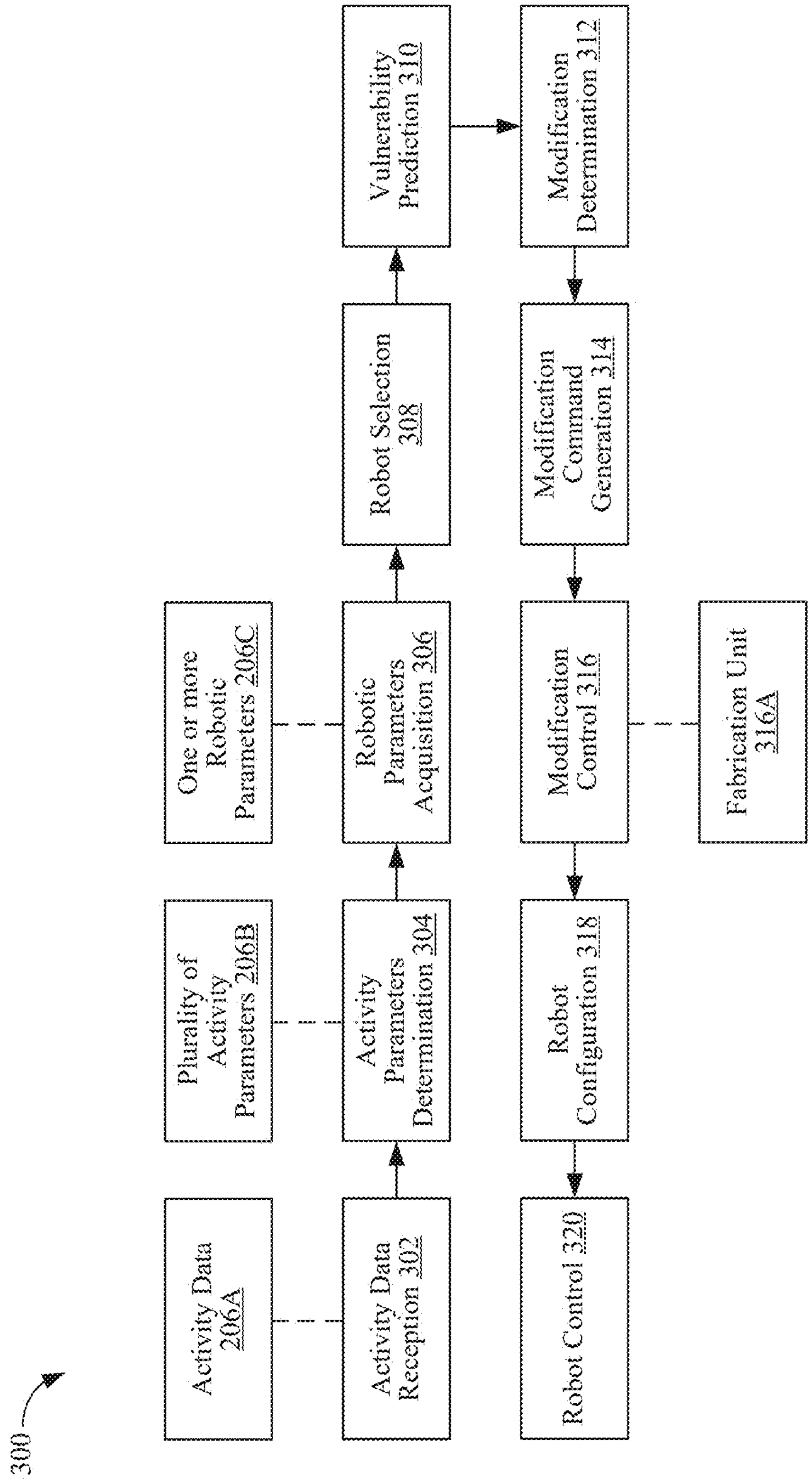
FIG. 3 is a diagram that illustrates exemplary operations for controlling the modified set of robots, in accordance with an embodiment of the disclosure.

FIG. 3 is a diagram that illustrates exemplary operations for controlling the modified set of robots, in accordance with an embodiment of the disclosure. FIG. 3 is explained in conjunction with elements from FIG. 1 and FIG. 2. With reference to FIG. 3, there is shown the block diagram 300 that illustrates the exemplary operations from 302 to 320, as described herein. The exemplary operations illustrated in the block diagram 300 start at 302 and are performed by a computing system, an apparatus, or a device, such as by the computer 102 of FIG. 1 or by the computer system 202 of FIG. 2. Although illustrated with discrete blocks, the exemplary operations associated with one or more blocks of the block diagram 300 can be divided into additional blocks, combined into fewer blocks, or eliminated, depending on the implementation.

At 302, an activity data reception operation is executed. In the activity data reception operation, the computer system 202 receives the activity data 206A associated with the at least one activity 204A to be executed in the activity area 204. The activity data 206A includes at least one of surface data associated with a surface of the activity area 204, activity specification data associated with the at least one activity 204A, or environmental data associated with the environment of the activity area 204. In an embodiment, the computer system 202 receives the activity data 206A from the one or more data sources 206 upon reception of a user request, which includes details of the at least one activity 204A to be executed in the activity area 204. In an embodiment, the activity area 204 may include, but is not limited to, a mining site. The at least one activity 204A may include, but is not limited to, collecting a dirt sample from the activity area 204.

At 304, an activity parameters determination operation is executed. In the activity parameters execution operation, the computer system 202 determines the plurality of activity parameters 206B associated with the at least one activity 204A based on the activity data 206A. The plurality of activity parameters 206B includes at least one of a set of entities present within the activity area 204, a type of activity to be performed by the modified set of robots 210 in the activity area 204, a plurality of activity specifications associated with the type of activity to be performed by the modified set of robots 210A in the activity area 204, or a set of risk factors associated with the type of activity to be performed by the modified set of robots 210A in the activity area 204. By way of example, and not by limitation, the plurality of activity parameters 206B may include, but are not limited to, determination of a geographical location of a site in the mining area from where a dirt sample may be collected, a volume of dirt that may be collected, or a count of obstacles that are present in a vicinity of the geographical location of the site in the mining area from where the dirt sample may be collected.

At 306, a robotic parameters acquisition operation is executed. In the robotic parameters acquisition operation, the computer system 202 obtains the one or more robotic parameters 206C associated with each robot of a plurality of robots 208. The one or more robotic parameters 206C may include at least one of the count and a type of the actuators in each robotic module of the plurality of robots 208, the length and the movement direction of the actuators in each robot of the plurality of robots 208, the count and the type of joints in each robot of the plurality of robots 208, the count and the type of sensors in each robot of the plurality of robots 208, the distribution of mass within each robot of the plurality of robots 208, the count of movable components in each robot of the plurality of robots 208, and the count of immovable components in each robot of the plurality of robots 208. By way of example, the computer system 202 obtains mobility data associated with each robot of the plurality of robots 208, which may include information associated with mobility of each robot of the plurality of robots 208. The mobility data may include, but not limited to, maximum speed, balance of each robot while navigating within the activity area 204, or a type of locomotion of each robot of the plurality of robots 208. Examples of the type of locomotion may include, but not limited to, wheels, caterpillar tracks, or legs.

At 308, a robot selection operation is executed. In the robot selection operation, the computer system 202 is configured to select the set of robots 210 from the plurality of robots 208 based on the plurality of activity parameters 206B and the one or more robotic parameters 206C. By way of example, and not by limitation, the plurality of activity parameters 206B may include the collection and storage of the dirt sample from a specific site in the mining area. The one or more robotic parameters 206C may include mobility of a robot, which may assist in the navigation of the robot in rocky terrain present within the mining site. By way of example, and not by limitation, the plurality of robots 208 includes robots A, B, C, and D. The computer system 202 selects the set of robots 210 including the robot A and the robot C from the plurality of robots 210 to execute the at least one activity 204A. The robot A is selected based on mobility that may assist in the execution of the at least one activity 204A and the robot D is selected to collect the dirt sample. The mobility that may assist in the execution of the at least one activity 204A refers to a minimum mobility of the robot A to navigate within the activity area 204 while performing the at least one activity 204A. The robot D is configured to dig the site in the mining area to collect the dirt sample and further collect the dirt sample in a storage box associated with the robot D.

In an embodiment of the disclosure, the computer system 202 utilizes historical data, the plurality of activity parameters 206B, and the one or more robotic parameters 206C to select the set of robots 210 from the plurality of robots 208. The historical data include a collection of records that contain information associated with execution of the at least one activity 204A over a specified period. The historical data may include, by way of example, and not by limitation, mobility of the set of robots 210 that may assist in the execution of the at least one activity 204A, a speed of the set of robots 210, that may assist in the execution of the at least one activity 204A, or a specific function (e.g., a digging mechanism to extract dirt from surface of the mining area) of the set of robots 210 to execute the at least one activity 204A.

In an embodiment of the disclosure, each robot of the set of robots 210 may include, and not by limitation, motors, sensors, power mechanisms, or connectors. Motors are responsible for providing movement to actuate joints, wheels, or movable parts of the set of robots 210. Examples of sensors may include, but not limited to, cameras, distance sensors, or humidity sensors. A power mechanism is used to transfer power from a central source (for example, electrical grid, battery system, or fuel cells) to the set of robots 210 to ensure continuous power supply for operation of the set of robots 210. The connectors are used to securely attach robots. The connectors may include, but not limited to, physical pins, magnets, or electrical contacts.

In an embodiment, the computer system 202 applies a first AI model to the plurality of activity parameters 206B and the one or more robotic parameters 206C to generate a visual representation of the plurality of robots 208. The computer system 202 further simulates the virtual representation of the plurality of robots 208 to generate a simulation result. The computer system 202 further utilizes the simulation result to select the set of robots 210. Details about selecting the set of robots 210 based on the simulation result are provided, in FIG. 4.

At 310, a vulnerability prediction operation is executed. In the vulnerability prediction operation, the computer system 202 predicts the one or more vulnerabilities 212 associated with the execution of the at least one activity 204A by the set of robots 210. The one or more vulnerabilities 212 are predicted based on the plurality of activity parameters 206B and the one or more robotic parameters 206C. The one or more vulnerabilities 212 may include, but are not limited to, mechanical failure of the joints and the connectors present within the set of robots 210, interference in mobility of the set of robots 210 due to rigid connections present within the set of robots 210, load-bearing capacity of physical connections present within the set of robots 210, alignment issues present within the set of robots 210 and safety hazards from pinch points or sharp edges present within the set of robots 210.

By way of example, and not by limitation, the computer system 202 predicts the one or more vulnerabilities 212 in the set of robots 210 based on soil texture of a surface of a specific site within a mining area from which a dirt sample is to be collected, and a length of an arm attached to an earth digging robot associated with the set of robots 210. The computer system 202 predicts the one or more vulnerabilities 212 that an additional layer of robotic material for the earth-digging robot and an extension (e.g., 5 centimeters) in the length of the arm attached to the earth-digging robot that may assist in the execution of the at least one activity 204A (e.g., collecting the dirt sample) in the activity area 204 (e.g., the mining site).

At 312, a modification determination operation is executed. In the modification determination operation, the computer system 202 determines the one or more modifications 214 based on the one or more vulnerabilities 212. The one or more modifications 214 are performed in the set of robots 210 to resolve the one or more vulnerabilities 212. In an embodiment, the computer system 202 determines the one or more robots from the set of robots 210 based on the one or more vulnerabilities 212. The computer system 202 determines the one or more modifications 214 in the one or more robots to resolve the one or more vulnerabilities 212.

In an embodiment, the one or more modifications 214 may include inclusion of a portion of the robotic material to at least one robot of the set of robots 210. In an alternate embodiment, the one or more modifications indicate the removal of a portion of the robotic material from at least one robot of the set of robots 210. In an embodiment, the one or more modifications are determined in the one or more robots of the set of robots 210.

By way of example, and not by limitation, the computer system 202 determines the one or more modifications 214 including modifying the set of robots 210 by adding the additional layer of robotic material for the earth-digging robot, and adding the robotic material to the arm attached to the earth-digging robot to increase the length of the arm attached to the earth digging robot by 'z centimeters'.

At 314, a modification command generation operation is executed. In the modification command generation operation, the computer system 202 generates the modification command 216 indicative of the one or more modifications 214 to be performed by the set of robots 210. In an embodiment of the disclosure, the computer system 202 generates the modification command indicative of the one or more modifications 214 to be performed in the one or more robots of the set of robots 210. The modification command 216 is indicative of a computer-implemented instruction that is generated by the computer system 202 to modify the set of robots 210 based on the one or more modifications 214. In an embodiment of the disclosure, the computer system 202 executes the modification command 216 indicative of the one or more modifications 214 to be performed by the set of robots 210.

By way of example, and not by limitation, the modification command 216 includes a series of instructions to increase the length of the arm attached to the earth-digging robot. The series of instructions may include, but not limited to identifying the earth-digging robot of the set of robots 210 on which the one or more modifications are to be performed, a quantity of the robotic material to increase the length of the arm of the earth digging robot, and a coupling mechanism to be used to connect original arm of the earth digging robot with an extended arm to be modified to increase the length of the arm of the earth digging robot.

At 316, a modification control operation is executed. In the modification control operation, the computer system 202 controls the one or more modifications 214 in the one or more robots based on the modification command 216. In an embodiment of the disclosure, the computer system 202 controls a fabrication unit 316A to control the one or more modifications 214 in the one or more robots based on the modification command 216. The fabrication unit 316A utilizes manufacturing tools (e.g., three-dimensional (3D) printers, surface grinding tools) and techniques (e.g., laser cutting technique, welding) to design, construct, and customize the one or more robots. The fabrication unit 316A is utilized to modify the one or more robots through the inclusion or removal of the robotic material from the one or more robots, which enables reconfiguration of the one or more robots to meet specific operational requirements or tasks for the execution of the at least one activity 204A by the set of robots 210. Examples of the fabrication unit 316A include, but not limited to, 3D printing machines, welding machines, and laser cutting machines. In an embodiment, the computer system 202 generates the modified set of robots 210A upon the modification of the one or more robots of the set of robots 210 based on the modification command 216.

By way of example, and not by limitation, the computer system 202 controls the fabrication unit 316A to add a layer of 'x centimeters' of thickness to the earth-digging mechanism of the earth-digging robot based on the modification command 216. The addition of the robotic material to the earth-digging mechanism of the earth-digging robot increases strength of the earth-digging mechanism and resolves the one or more vulnerabilities 212 that may lead to a breakdown of the earth-digging mechanism of the earth-digging robot while executing the at least one activity 204A.

By way of example, and not by limitation, the computer system 202 controls the fabrication unit 316A to reduce the length of the arm of the earth-digging robot by reducing a length of 'y centimeters' from the arm of the earth-digging robot. The reduction in the length of the arm of the earth-digging robot increases the maneuverability of the set of robots 210 to overcome the one or more vulnerabilities 212 that may hamper navigation of the set of robots 210 in confined spaces present within the activity area 204.

At 318, a robot configuration operation is executed. In the robot configuration operation, the computer system 202 configures the modified set of robots 210A to execute the at least one activity 204A. In an embodiment, the computer system 202 assembles the modified one or more robots of the set of robots 210 with supplementary robots of the set of robots 210 to configure the modified set of robots 210A. By way of example, and not by limitation, the computer system 202 modifies the robot A of the set of robots 210 and further configures the modified robot A with the robot D of the set of robots 210. By way of example, and not by limitation, the computer system 202 connects the modified robot A with the robot D through mechanical coupling mechanisms such as, but not limited to clamps, brackets, or hinges.

In an embodiment, the computer system 202 applies a second AI model to the one or more robotic parameters 206C associated with the modified set of robots 210A to determine one or more coupling parameters for the modified set of robots 210A. The computer system 202 further generates a coupling command based on the determined one or more coupling parameters. The coupling command is indicative of the configuration of the modified set of robots 210A. Details about the application of the second AI model and generation of the coupling command are provided, in FIG. 5.

At 320, a robot control operation is executed. In the robot control operation, the computer system 202 controls the modified set of robots 210A based on the configuration of the modified set of robots 210A. The modified set of robots 210A is controlled to execute the at least one activity 204A. In an embodiment, the computer system 202 applies a third AI model to the one or more robotic parameters 206C associated with each robot of the modified set of robots 210 to determine a trajectory for the modified set of robots 210A. The computer system 202 further generates a trajectory command for the modified set of robots 210A based on the determined trajectory. The computer system 202 further transmits the trajectory command to the modified set of robots 210A. The trajectory command instructs the modified set of robots 210A to follow the determined trajectory to execute the at least one activity 204A. Details about applying the third AI model and determining the trajectory command are provided in FIG. 6, and its corresponding description.

Figure 4:
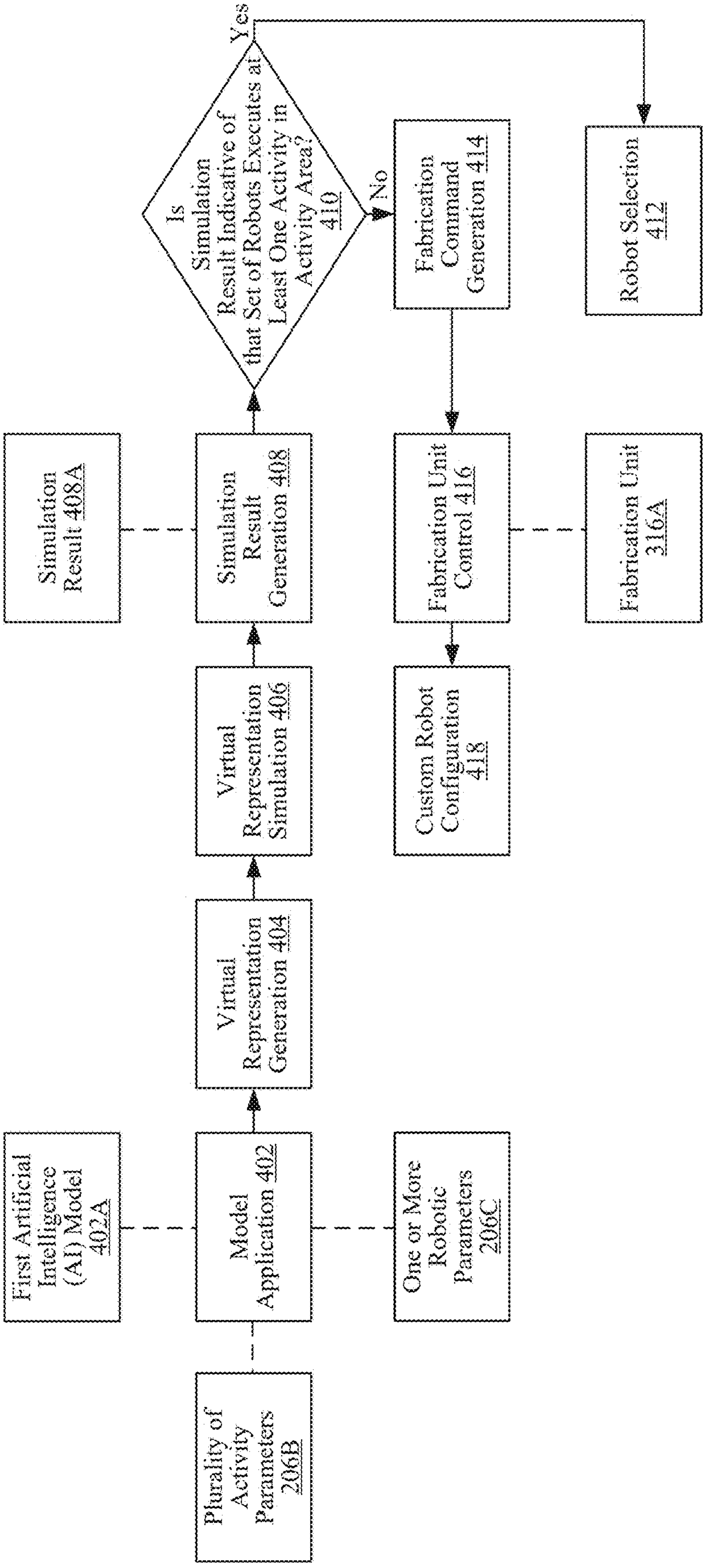
FIG. 4 is a diagram that illustrates exemplary operations to simulate the plurality of robots, in accordance with an embodiment of the disclosure.

FIG. 4 is a diagram that illustrates exemplary operations to simulate the plurality of robots, in accordance with an embodiment of the disclosure. FIG. 4 is explained in conjunction with elements from FIG. 1, FIG. 2, and FIG. 3. With reference to FIG. 4, there is shown the block diagram 400 that illustrates the exemplary operations from 402 to 418, as described herein. The exemplary operations illustrated in the block diagram 400 start at 402 and are performed by any computing system, apparatus, or device, such as by the computer 102 of FIG. 1 or by the computer system 202 of FIG. 2. Although illustrated with discrete blocks, the exemplary operations associated with one or more blocks of the block diagram 400 can be divided into additional blocks, combined into fewer blocks, or eliminated, depending on the implementation.

At 402, a model application operation is executed. In the model application operation, the computer system 202 applies a first AI model 402A to the plurality of activity parameters 206B and the one or more robotic parameters 206C to generate the visual representation of the plurality of robots 208. The first AI model 402A of the computer system 202 may be a computational network or a system of artificial neurons, arranged in a plurality of layers, with each layer consisting of one or more nodes (or artificial neurons). The plurality of layers of the first AI model 402A may include an input layer, one or more hidden layers, and an output layer. Outputs of all nodes in the input layer may be coupled to at least one node in the hidden layer(s). Similarly, inputs of each hidden layer may be coupled to outputs of at least one node in layers of the first AI model 402A. Outputs of each hidden layer may be coupled to inputs of at least one node in subsequent layers of the first AI model 402A. Node(s) in the final layer may receive inputs from at least one hidden layer to output a result. The number of layers and the number of nodes in each layer may be determined from hyper-parameters of the first AI model 402A. Such hyper-parameters may be set before or while training the first AI model 402A on a training dataset.

Each node of the first AI model 402A may correspond to a mathematical function (e.g., a sigmoid function or a rectified linear unit) with a set of parameters, tunable during training of the first AI model 402A. The set of parameters may include, but not limited to, a weight parameter, or a regularization parameter. Each node may use the mathematical function to compute an output based on one or more inputs from nodes in layer(s) (e.g., previous layer(s)) of the first AI model 402A. The nodes of the first AI model 402A may correspond to the mathematical function. In an alternate embodiment, the nodes of the first AI model 402A may correspond to an alternate mathematical function.

In training of the first AI model 402A, one or more parameters of each node of the first AI model 402A may be updated based on whether an output of the final layer for a given input (from the training dataset) matches a correct result based on a loss function for the first AI model 402A. The above process may be repeated for the same or a different input until a minima of loss function may be achieved, and a training error may be minimized. Methods for training may include, but not be limited to, gradient descent, stochastic gradient descent, batch gradient descent, gradient boost, or meta-heuristics.

The first AI model 402A may include electronic data, such as, for example, a software program, code of the software program, libraries, applications, scripts, logic, or instructions for execution by a processing device, such as processor set. The first AI model 402A may include codes and routines configured to enable a computing device, such as the computer system 202, to perform one or more operations. Additionally, or alternatively, the first AI model 402A may be implemented using hardware including a processor, a microprocessor (e.g., to perform or control performance of one or more operations), a field-programmable gate array (FPGA), or an application-specific integrated circuit (ASIC). In an alternate embodiment, the first AI model 402A may be implemented using a combination of hardware and software. In an embodiment of the disclosure, the first AI model 402A may be a separate entity from the computer system 202. In an embodiment, the first AI model 402A may be integrated within the computer system 202. Examples of the first AI model 402A may include, but are not limited to, a deep neural network (DNN), a convolutional neural network (CNN), a CNN-recurrent neural network (CNN-RNN), an artificial neural network (ANN), a fully connected neural network, a generative adversarial network (GAN), or a combination of such networks.

At 404, a visual representation generation operation is executed. In the visual representation generation operation, the computer system 202 generates the virtual representation of the plurality of robots 208. The virtual representation of the plurality of robots 208 may be generated based on the application of the first AI model 402A to the plurality of activity parameters 206B and the one or more robotic parameters 206C. The virtual representation may be a digital twin of the plurality of robots 208 generated using the plurality of activity parameters 206B and the one or more robotic parameters 206C. In the generation of the virtual representation of the plurality of robots 208, the computer system 202 may be configured to obtain the one or more robotic parameters 206C associated with the plurality of robots 208 using a set of sensors installed within the environment of the activity area 204. In an exemplary embodiment of the disclosure, the set of sensors may include, but are not limited to, infrared sensors, ultrasonic sensors, laser sensors, camera sensors, Radio-Frequency Identification (RFID) sensors, or accelerometers. Further, stored environmental knowledge may be programmed ahead of time and may correspond to information about surroundings or context in which the at least one activity 204A may be performed. The stored environment knowledge may include details, such as a location of obstacles in the activity area 204, a layout of the environment of the activity area 204, and relevant factors that may impact how the at least one activity 204A may be executed in the activity area 204. In an exemplary embodiment of the disclosure, the one or more robotic parameters 206C include at least one of a location of one or more Region of Interests (ROIs) associated with the at least one activity 204A within the activity area 204, one or more obstacles in the activity area 204, one or more workpieces located in the activity area 204, a position or an orientation of each of the plurality of robots 208 in the environment of the activity area 204.

At 406, a virtual representation simulation operation is executed. In the virtual representation simulation operation, the computer system 202 simulates the virtual representation of the plurality of robots 208 based on an environment of the activity area 204. In an embodiment of the disclosure, the computer system 202 simulates different combinations of robots present in the plurality of robots 208 to execute the at least one activity 204A in a virtual representation of the activity area 204. In an embodiment of the disclosure, the computer system 202 runs different simulations on the plurality of robots 208 to determine, by way of example, and not by limitation, performance of the set of robots 210 under different conditions, and potential incidents that may arise with execution of the at least one activity 204A by the set of robots 210. By way of example, and not by limitation, the simulation may mimic and analyze the behavior of the plurality of robots 208 thereby reducing risks associated with the set of robots 210 of the plurality of robots 208 executing the at least one activity 204A in a real-world implementation. The risks may include, for example, but not limited to, safety risks, performance risks, or operational risks associated with the set of robots 210 while performing the at least one activity 204A in the activity area 204.

The safety risks associated with the set of robots 210 indicate potential hazards (e.g., presence of obstacles) that may lead to mechanical failure of the set of robots 210 while performing the at least one activity 204A. The simulation of the set of robots 210 analyzes and reduces the safety risks such as (but not by way of limitation) avoiding obstacles while navigation to prevent mechanical failure of the set of robots 210. The performance risks associated with the set of robots 210 indicate potential performance bottlenecks that may lead to a failure of the set of robots 210 in performing the at least one activity 204A. For example, a wheelbase of 0.5 meters of the set of robots 210 may lead to the failure of the set of robots 210 in performing the at least one activity 204A. The computer system 202 analyzes the simulation of the set of robots 210 to determine the wheelbase of 0.8 meters of the set of robots 210 that prevents the performance risks associated with the set of robots 210 to perform the at least one activity 204A. The operational risks associated with the set of robots 210 indicate potential risks that may arise while the set of robots 210 is performing the at least one activity 204A within the activity area 204. For example, the set of robots 210 may overheat in the activity area 204 while performing the at least one activity 204A due to high temperature (e.g., 60 degrees Celsius) in the environment of the activity area 204. The simulation of the set of robots 210 may be analyzed to determine a period of time for the set of robots 210 to be operational in the activity area 204 such that the set of robots 210 may not experience a failure while executing the at least one activity 204A.

In an embodiment of the disclosure, the computer system 202 may utilize the historical data associated with the execution of the at least one activity 204A to simulate the virtual representation of the plurality of robots 208. By way of example, and not by limitation, the computer system 202 determines a mobility that may assist in the execution of the at least one activity 204A based on the historical data. The simulation of the plurality of robots 208 includes, but not limited to mobility of the plurality of robots 208 while performing different types of arm movements, weight balancing of the plurality of robots 208, and moveable parts in each robot of the plurality of robots 208.

The computer system 202 utilizes the environmental data associated with the activity area 204 to generate a digital representation of the environment of the activity area 204. The computer system 202 further generates the virtual representation of each robot of the plurality of robots 208. The virtual representation may represent, by way of example, but not limited to, arms of each robot of the plurality of robots 208, joints present in each robot of the plurality of robots 208, sensors present in each robot of the plurality of robots 208, and the actuators present in each robot of the plurality of robots 208. The computer system 202 further utilizes a simulation logic to replicate an actual behavior of each robot of the plurality of robots 208 in the digital representation of the environment of the activity area 204. The simulation logic refers to a set of rules that govern the behavior and interactions of the plurality of robots 208 within the digital representation of the environment of the activity area 204. In an embodiment of the disclosure, the computer system 202 incorporates real-life characteristics to improve accuracy and similarity between the real-life execution of the at least one activity 204A and simulation of the execution of the at least one activity 204A. The real-life characteristics may include, but not limited to, gravity, friction of the surface of the activity area 204, or air resistance in the activity area 204.

In an embodiment, the computer system 202 simulates arm movements to be performed by each robot of the plurality of robots 208 to execute the at least one activity 204A. The computer system 202 utilizes the degree of freedom of each robot of the plurality of robots 208 to simulate the arm movements of each robot of the plurality of robots 208. The computer system 202 performs trials and errors of different combinations of robots of the plurality of robots 208. The trial and error may include, and not by limitation, arm length of each robot of the plurality of robots 208, a cross-section area of each robot of the plurality of robots 208, flexibility of each robot of the plurality of robots 208, and weight distribution in each robot of the plurality of robots 208. The USO computer system 202 simulates moveable parts present in the plurality of robots 208 such as, grippers, and wheels to simulate interaction of the grippers and the wheels with the environment of the activity area 204.

At 408, a simulation result generation operation is executed. In the simulation result generation operation, the computer system 202 generates a simulation result 408A based on the simulation of the virtual representation of the plurality of robots 208. The simulation result 408A includes, but not limited to arm movements of each robot of the plurality of robots 208, lengths of arms of each robot of the plurality of robots 208, or weight balancing of each robot of the plurality of robots 208.

At 410, an operation to determine if the simulation result 408A indicates that the set of robots 210 executes the at least one activity 204A in the activity area 204, is executed. The computer system 202 selects the set of robots 210 from the plurality of robots 208 based on simulation result 408A.

At 412, if the simulation result 408A indicates that the set of robots 210 executes the at least one activity 204A in the activity area 204, the computer system 202 selects the set of robots 210 from the plurality of robots 208. The computer system 202 further configures and controls the set of robots 210 to execute the at least one activity 204A in real time in the activity area 204.

At 414, if the simulation result 408A indicates that the set of robots 210 does not execute the at least one activity 204A in the activity area 204, then the computer system 202 generates a fabrication command based on the simulation result 408A. The fabrication command is indicative of a computer-implemented instruction that is generated by the computer system 202 to fabricate a custom robot that is different from each robot of the plurality of robots 208. The computer system 202 is configured to fabricate the custom robot based on the fabrication command. The modification of the set of robots 210 is done by configuring the set of robots 210 with the custom robot enabling the modified set of robots 210A to execute the at least one activity 204A. By way of example, and not by limitation, the custom robot is configured with the set of robots 210 by connecting the set of robots 210 with the custom robot through mechanical connectors such as, but not limited to, screws, hinges, or clamps.

By way of example, and not by limitation, a wheel mechanism that may assist in the execution of the at least one activity 204A. However, the plurality of robots 208 does not include the wheel mechanism. The computer system 202 generates the fabrication command to fabricate (or construct) the wheel mechanism.

At 416, a fabrication unit control operation is executed. In the fabrication unit control operation, the computer system 202 controls the fabrication unit 316A to fabricate the custom robot based on the fabrication command. By way of example, and not by limitation, the fabrication command is indicative of the fabrication of the wheel mechanism. The computer system 202 controls the fabrication unit 316A to fabricate the wheel mechanism based on the fabrication command.

At 418, a custom robot configuration operation is executed. In the custom robot configuration operation, the computer system 202 configures the custom robot with the set of robots 210 to configure the modified set of robots 210A. The modified set of robots 210A executes the at least one activity 204A. In an embodiment, the configuration of the custom robot and the set of robots 210 corresponds to assembling and connecting the custom robot with the set of robots 210 to configure the modified set of robots 210A. The computer system 202 configures the custom robot with the set of robots 210 through, for example, but not limited to, mechanical connectors, magnetic connectors, or hydraulic connectors. The mechanical connectors may utilize clamps, hinges, screws, or brackets to configure (or integrate) the custom robot with the set of robots 210. The magnetic connectors may utilize magnets to configure the custom robot with the set of robots 210. The hydraulic connectors may utilize pipes to configure the custom robot with the set of robots 210. The pipes may allow fluid transfer of compressed air or pressurized fluids (e.g., water-glycol solution) between the custom robot and the set of robots 210. In an embodiment, the custom robot may be connected with a subset of robots of the set of robots 210. In an alternate embodiment of the disclosure, the custom robot may be connected with each robot of the set of robots 210. The computer system 202 further controls the modified set of robots 210A to execute the at least one activity 204A.

Figure 5:
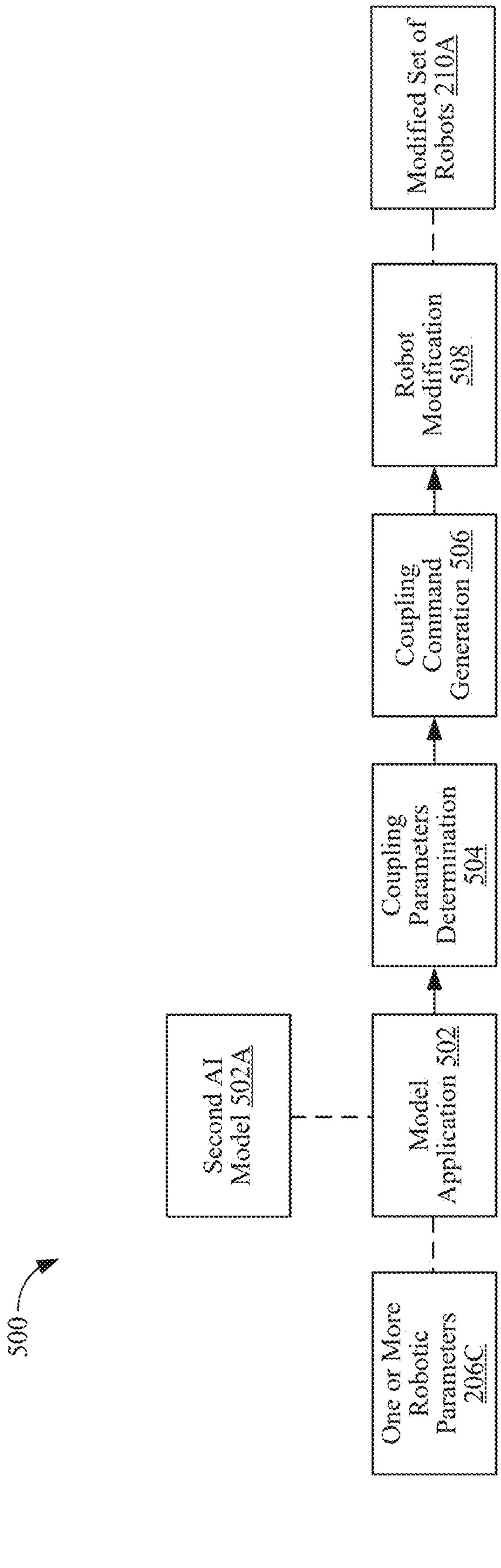
FIG. 5 is a diagram that illustrates exemplary operations for modifying the set of robots, in accordance with an embodiment of the disclosure.

FIG. 5 is a diagram that illustrates exemplary operations for modifying the set of robots, in accordance with an embodiment of the disclosure. FIG. 5 is explained in conjunction with elements from FIG. 1, FIG. 2, FIG. 3, and FIG. 4. With reference to FIG. 5, there is shown the block diagram 500 that illustrates the exemplary operations from 502 to 508, as described herein. The exemplary operations illustrated in the block diagram 500 start at 502 and are performed by any computing system, apparatus, or device, such as by the computer 102 of FIG. 1 or by the computer system 202 of FIG. 2. Although illustrated with discrete blocks, the exemplary operations associated with one or more blocks of the block diagram 500 can be divided into additional blocks, combined into fewer blocks, or eliminated, depending on the implementation.

At 502, a model application operation is executed. In the model application operation, the computer system 202 applies a second AI model 502A to the one or more robotic parameters 206C to determine the one or more coupling parameters for the modified set of robots 210A. The second AI model 502A is an exemplary embodiment of the first AI model 402A. In an embodiment, functionalities of the first AI model 402A and the second AI model 502A can be clubbed together in an AI model. In an alternate embodiment of the disclosure, the computer system 202 can utilize more than two AI models (a plurality of AI models) for performing the functionalities of the first AI model 402A and the second AI model 502A.

At 504, a coupling parameters determination operation is executed. In the coupling parameters determination operation, the computer system 202 determines the one or more coupling parameters for the modified set of robots 210A based on the application of the second AI model 502A to the one or more robotic parameters 206C. The one or more coupling parameters include at least one of a degree of freedom of each robot of the modified set of robots 210A, a type of movement of each robot of the modified set of robots 210A, a range of motion in each joint of each robot of the modified set of robots 210A, a flexibility in each joint of each robot of the modified set of robots 210A, a position of each effector of each robot of the modified set of robots 210A, or an orientation of each effector of each robot of the modified set of robots 210A. The degree of freedom (DOF) refers to a number of independent movements that are present in each robot of the modified set of robots 210A.

At 506, a coupling command generation operation is executed. In the coupling command generation operation, the computer system 202 generates the coupling command indicative of configuration of the modified set of robots 210A based on the one or more coupling parameters. The coupling command is indicative of a computer-implemented instruction that is generated by the computer system 202 to configure the modified set of robots 210A. By way of example, and not by limitation, the coupling command is indicative of coupling the modified set of robots 210A by means of an interlocking structure present on each robot of the modified set of robots 210A.

In an embodiment of the disclosure, the coupling of the modified set of robots 210A may correspond to a flexible coupling, which refers to a mechanical connection that allows for relative motion between two components (e.g., robot A and robot B of the modified set of robots 210A). The flexible coupling is tolerable to, by way of example, and not by limitation, misalignment, vibration, and thermal expansion between the robot A and the robot B of the modified set of robots 210A, thereby enabling smooth transmission of torque and motion between the robot A and the robot B of the modified set of robots 210A.

In an alternate embodiment of the disclosure, the coupling of the modified set of robots 210A corresponds to a rigid coupling. The rigid coupling refers to a mechanical connection that firmly joins two robots (e.g., robot C and robot D of the modified set of robots 210A) without allowing for any relative motion or flexibility between the robot C and the robot D of the modified set of robots 210A. The mechanical connection may ensure the alignment and direct transmission of torque and motion between the robot C and the robot D of the modified set of robots 210A.

In an embodiment of the disclosure, the computer system 202 utilizes forward kinematics and inverse kinematics to calculate angles of joints present within the modified set of robots 210A, and a position of end effectors present in the modified set of robots 210A. The forward kinematics is a process of calculating a position and an orientation of each end effector of total end effectors present in the modified set of robots 210A. The inverse kinematics is a computational process of determining parameters that are utilized to achieve a desired position and an orientation of each end effector of the total end effectors present in the modified set of robots 210A.

At 508, a robot modification operation is executed. In the robot modification operation, the computer system 202 configures the modified set of robots 210A based on the coupling command. The configuration of the modified set of robots 210A is by coupling the modified set of robots 210A such that the modified set of robots 210A executes the at least one activity 204A. By way of example, and not by limitation, the computer system 202 configures the modified set of robots 210A to execute the at least one activity 204A indicative of the collection of dirt samples from the specific site in the mining area.

Figure 6:
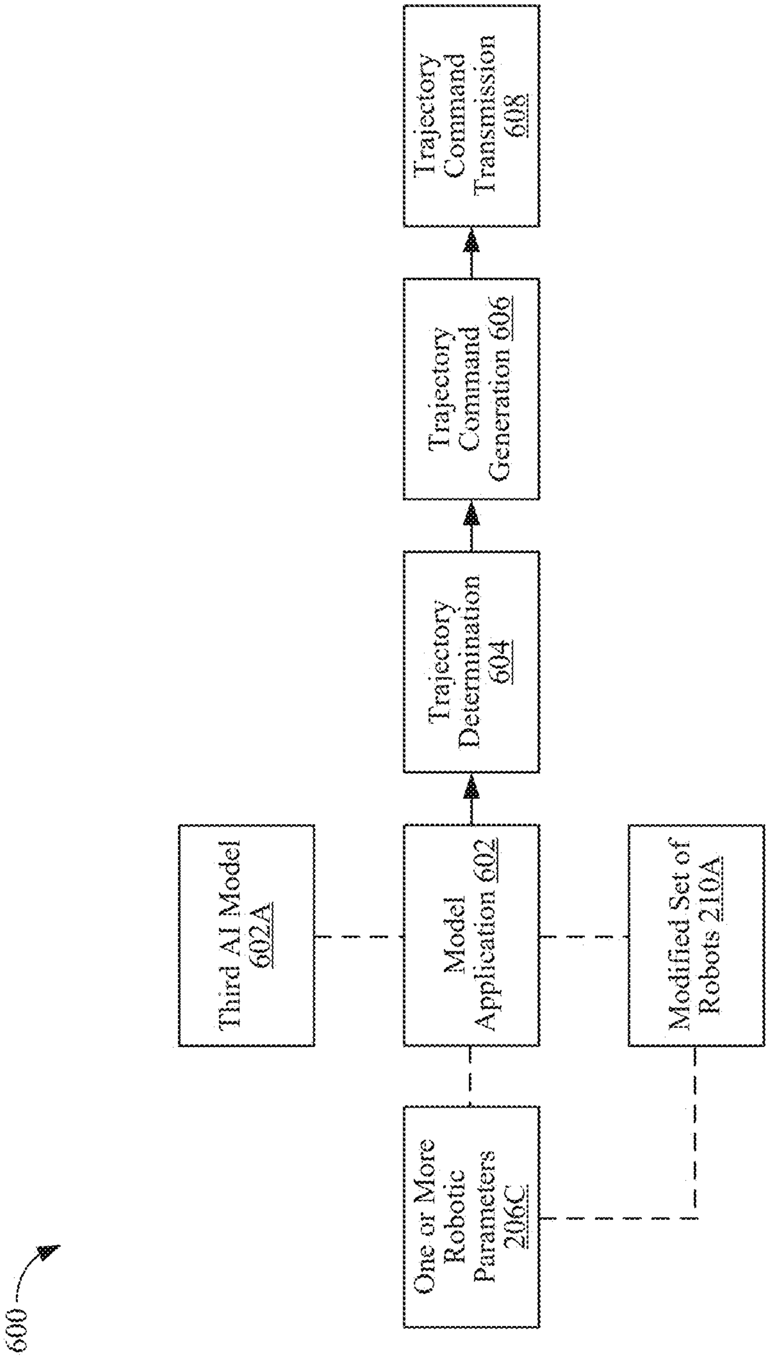
FIG. 6 is a diagram that illustrates exemplary operations for determining trajectory for the modified set of robots, in accordance with an embodiment of the disclosure.

FIG. 6 is a diagram that illustrates exemplary operations for determining trajectory for the modified set of robots, in accordance with an embodiment of the disclosure. FIG. 6 is explained in conjunction with elements from FIG. 1, FIG. 2, FIG. 3, FIG. 4, and FIG. 5. With reference to FIG. 6, there is shown the block diagram 600 that illustrates the exemplary operations from 602 to 608, as described herein. The exemplary operations illustrated in the block diagram 600 start at 602 and are performed by any computing system, apparatus, or device, such as by the computer 102 of FIG. 1 or by the computer system 202 of FIG. 2. Although illustrated with discrete blocks, the exemplary operations associated with one or more blocks of the block diagram 600 can be divided into additional blocks, combined into fewer blocks, or eliminated, depending on the implementation.

At 602, the model application operation is executed. In the model application operation, the computer system 202 applies a third AI model 602A to the one or more robotic parameters 206C to determine the trajectory for the modified set of robots 210A. The third AI model 602A is an exemplary embodiment of the first AI model 402A. In an embodiment, functionalities of the first AI model 402A and the third AI model 602A can be clubbed together in an AI model. In an alternate embodiment of the disclosure, the computer system 202 can utilize more than two AI models (the plurality of AI models) for performing the functionalities of the first AI model 402A and the third AI model 602A.

In an alternate embodiment of the disclosure, the functionalities of the first AI model 402A, the second AI model 502A, and the third AI model 602A can be clubbed together in an AI model. In various embodiments of the disclosure, the computer system 202 can utilize more than three AI models (the plurality of AI models) for performing the functionalities of the first AI model 402A, the second AI model 502A, and the third AI model 602A.

At 604, a trajectory determination operation is executed. In the trajectory determination operation, the computer system 202 determines the trajectory for the modified set of robots 210A based on the application of the third AI model 602A to the one or more robotic parameters 206C. The trajectory is a defined path or sequence of positions that is utilized by the modified set of robots 210A for movement of the modified set of robots 210A within the activity area 204 to ensure control over the motion and positioning of the modified set of robots 210A while executing the at least one activity 204A in the activity area 204.

By way of example, and not by limitation, the computer system 202 uses a cubic splines function to determine the trajectory of the modified set of robots 210A. The cubic splines function may include a polynomial function of degree three that interpolates a set of data points and generates smooth and continuous curves of data points. The data points are utilized as a trajectory that is utilized by the modified set of robots 210A to navigate in the activity area 204.

At 606, a trajectory command generation operation is executed. In the trajectory command generation operation, the computer system 202 generates the trajectory command for the modified set of robots 210A based on the determined trajectory. The trajectory command is a computer-implemented set of instructions that instructs the modified set of robots 210A to follow the trajectory to execute the at least one activity 204A.

At 608, a trajectory command transmission operation is executed. In the trajectory command transmission operation, the computer system 202 transmits the trajectory command to the modified set of robots 210A. In an embodiment, the modified set of robots 210A is configured to navigate along the determined trajectory, as transmitted by the trajectory command, while executing the at least one activity 204A in the activity area 204.

Figure 7:
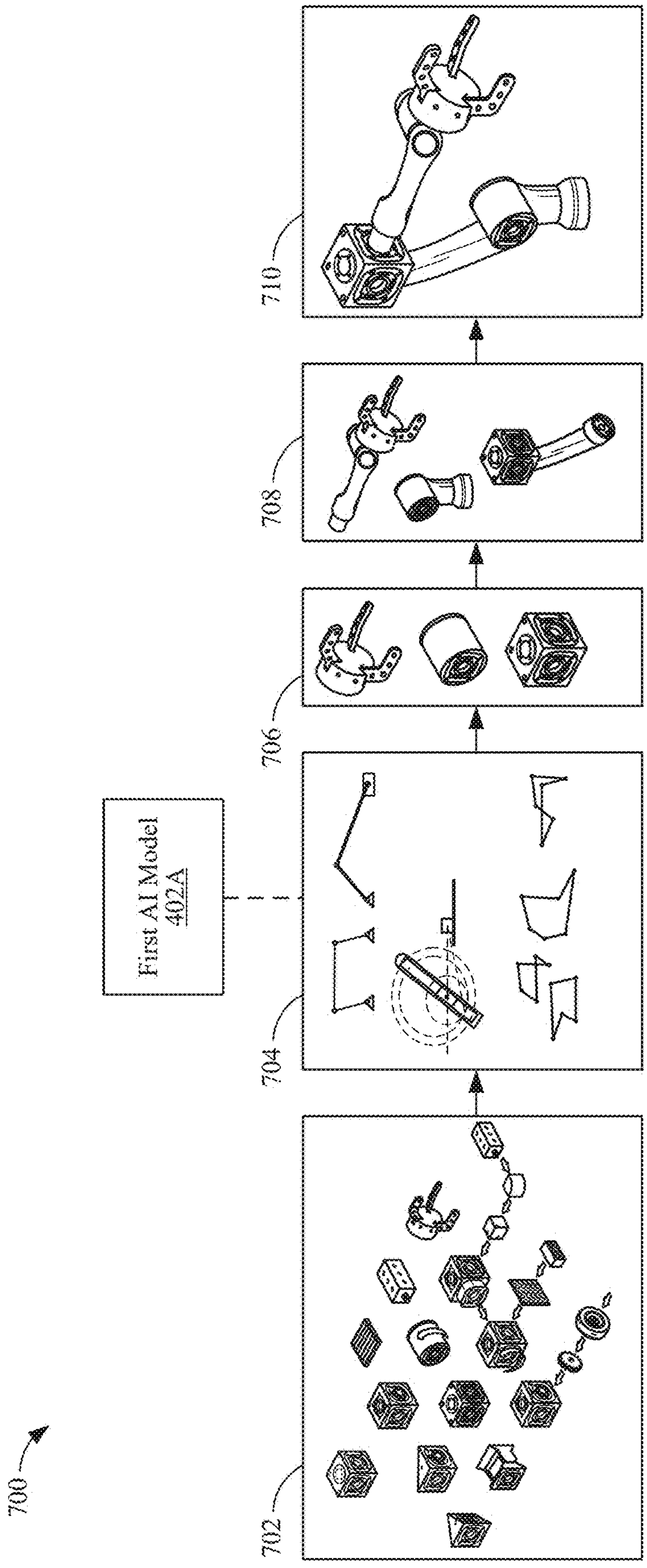
FIG. 7 is a diagram that illustrates an exemplary scenario for configuration of robots to execute an activity, in accordance with an embodiment of the disclosure.

FIG. 7 is a diagram that illustrates an exemplary scenario 700 for configuration of robots to execute an activity, in accordance with an embodiment of the disclosure. FIG. 7 is explained in conjunction with FIG. 1, FIG. 2, FIG. 3, FIG. 4, FIG. 5, and FIG. 6. FIG. 7 describes a plurality of robots 702, a simulation result 704, a set of robots 706, modified one or more robots 708, and a modified set of robots 710. FIG. 7 further shows the first AI model 402A. The plurality of robots 702 is an exemplary embodiment of the plurality of robots 208. The simulation result 704 is an exemplary embodiment of the simulation result 408A. The set of robots 706 is an exemplary embodiment of the set of robots 210. The modified set of robots 710 is an exemplary embodiment of the modified set of robots 210A.

In an embodiment, the computer system 202 obtains the activity data 206A associated with the at least one activity 204A to be executed in the activity area 204. The computer system 202 further determines the plurality of activity parameters 206B associated with the at least one activity 204A based on the activity data 206A. The computer system 202 obtains the one or more robotic parameters 206C associated with each robot of the plurality of robots 702. By way of example, and not by limitation, the plurality of robots 702 include robots A to T. The computer system 202 further applies the first AI model 402A to the plurality of activity parameters 206B and the one or more robotic parameters 206C. The computer system 202 generates the virtual representation of the plurality of robots 702 based on the application of the first AI model 402A to the plurality of activity parameters 206B and the one or more robotic parameters 206C. The computer system 202 simulates the virtual representation of the plurality of robots 702 and further generates the simulation result 704. Details about applying the first AI model 402A and the generation of the simulation result 704 are provided in the description of FIG. 4.

The computer system 202 further selects the set of robots 706 from the plurality of robots 702 based on the simulation result 704. By way of example, and not by limitation, the set of robots 706 includes robots B, D, and F. The computer system 202 further predicts the one or more vulnerabilities 212 associated with the execution of the at least one activity 204A by the set of robots 706. The one or more vulnerabilities 212 are predicted based on the plurality of activity parameters 206B and the one or more robotic parameters 206C. The computer system 202 further determines the one or more modifications 214 based on the one or more vulnerabilities 212. The one or more modifications 214 are performed in the one or more robots of the set of robots 706. The computer system 202 further generates the modification command 216 indicative of the one or more modifications 214 to be performed by the set of robots 706.

In an embodiment, the computer system 202 controls the fabrication unit 316A to perform the one or more modifications 214 in the one or more robots of the set of robots 210 based on the modification command 216. Upon the one or more modifications 214 in the one or more robots, the modified one or more robots 708 are assembled with the set of robots 706. The computer system 202 further configures the modified set of robots 710 by assembling the modified one or more robots 708 with the set of robots 706. Furthermore, the computer system 202 controls the modified set of robots 710 to execute the at least one activity 204A in the activity area 204.

Figure 8:
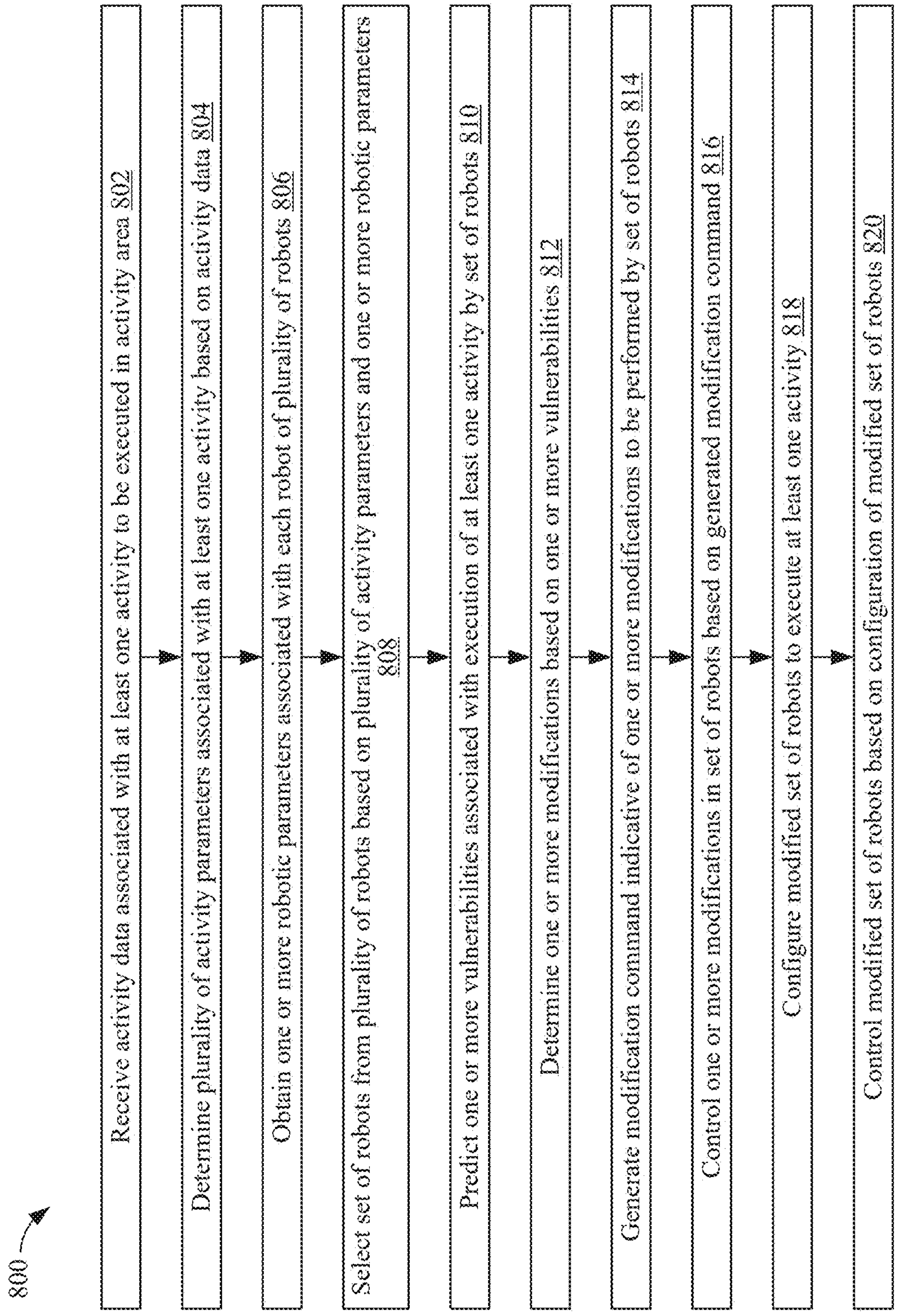
FIG. 8 is a diagram that illustrates a flowchart of a first exemplary method for configuration of robots to execute an activity, in accordance with an embodiment of the disclosure.

FIG. 8 is a diagram that illustrates a flowchart of a first exemplary method for configuration of robots to execute an activity, in accordance with an embodiment of the disclosure. FIG. 8 is explained in conjunction with elements from FIG. 1, FIG. 2, FIG. 3, FIG. 4, FIG. 5, FIG. 6, and FIG. 7. With reference to FIG. 8, there is shown a flowchart 800. The operations of the exemplary method may be executed by any computing system, for example, by the computer 102 of FIG. 1 or the computer system 202 of FIG. 2. The operations of the flowchart 800 may start at 802.

At 802, the activity data 206A associated with at least one activity 204A to be executed in an activity area 204 is received. In an embodiment, the computer system 202 receives the activity data 206A associated with at least one activity 204A to be executed in an activity area 204. Details about receiving the activity data 206A are provided in the description of FIG. 3.

At 804, the plurality of activity parameters 206B associated with the at least one activity 204A is determined based on the activity data 206A. In an embodiment, the computer system 202 determines the plurality of activity parameters 206B associated with the at least one activity 204A based on the activity data 206A. Details about determining the plurality of activity parameters 206B are provided in the description of FIG. 3.

At 806, the one or more robotic parameters 206C associated with each robot of the plurality of robots 208 is obtained. In an embodiment, the computer system 202 obtains the one or more robotic parameters 206C associated with each robot of the plurality of robots 208. Details about obtaining the one or more robotic parameters 206C are provided in the description of FIG. 3.

At 808, the set of robots 210 is selected from the plurality of robots 208 based on the plurality of activity parameters 206B and the one or more robotic parameters 206C. In an embodiment, the computer system 202 selects the set of robots 210 from the plurality of robots 208 based on the plurality of activity parameters 206B and the one or more robotic parameters 206C. Details about selecting the set of robots 210 are provided in the description of FIG. 3.

At 810, the one or more vulnerabilities 212 associated with an execution of the at least one activity 204A by the set of robots 210 are predicted based on the plurality of activity parameters 206B and the one or more robotic parameters 206C. In an embodiment, the computer system 202 predicts the one or more vulnerabilities 212 associated with an execution of the at least one activity 204A by the set of robots 210. The one or more vulnerabilities 212 are predicted based on the plurality of activity parameters 206B and the one or more robotic parameters 206C. Details about predicting the one or more vulnerabilities 212 are provided in the description of FIG. 3.

At 812, the one or more modifications 214 are determined based on the one or more vulnerabilities 212. The one or more modifications 214 are performed in the set of robots 210. In an embodiment of the disclosure, the computer system 202 determines the one or more modifications 214 based on the one or more vulnerabilities 212. The one or more modifications 214 are performed in the set of robots 210. Details about determining the one or more modifications 214 are provided in the description of FIG. 3.

At 814, the modification command 216 indicative of the one or more modifications 214 to be performed by the set of robots 210 is generated. In an embodiment, the computer system 202 generates the modification command 216 indicative of the one or more modifications 214 to be performed by the set of robots 210. Details about generating the modification command 216 are provided in the description of FIG. 3.

At 816, the one or more modifications 214 in the set of robots 210 are controlled based on the modification command 216. In an embodiment, the computer system 202 controls the one or more modifications 214 in the set of robots 210 based on the modification command 216. Details about controlling the one or more modifications 214 are provided in the description of FIG. 3.

At 818, the modified set of robots 210A is configured to execute the at least one activity 204A. In an embodiment, the computer system 202 configures the modified set of robots 210A to execute the at least one activity 204A. Details about configuring the modified set of robots 210A are provided in the description of FIG. 3.

At 820, the modified set of robots 210A is controlled based on the configuration of the modified set of robots 210A. The modified set of robots 210A is controlled to execute the at least one activity 204A. In an embodiment, the computer system 202 controls the modified set of robots 210A based on the configuration of the modified set of robots 210A. The modified set of robots 210A is controlled to execute the at least one activity 204A. Details about controlling the modified set of robots 210A are provided in the description of FIG. 3.

Figure 9:
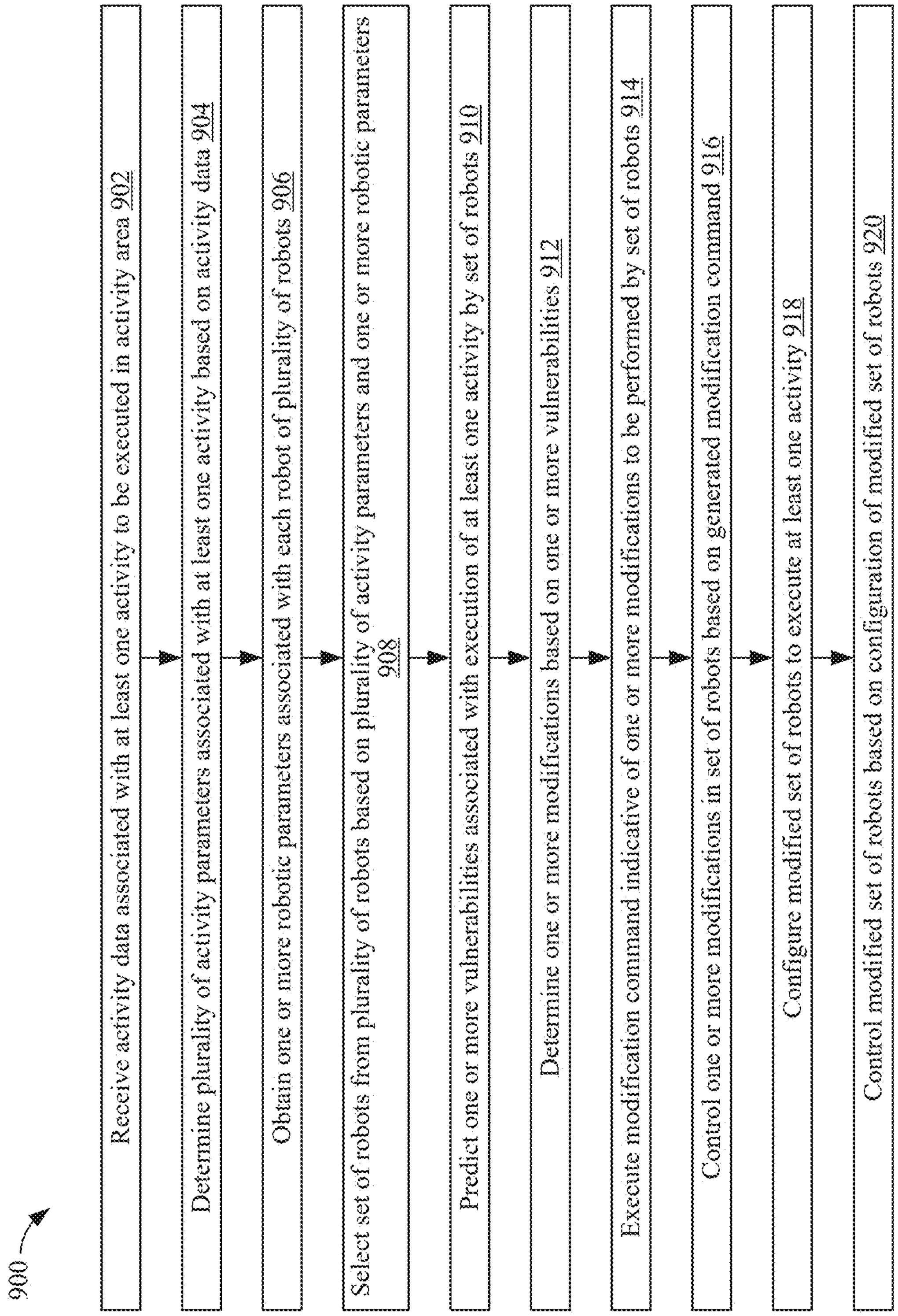
FIG. 9 is a diagram that illustrates a flowchart of a second exemplary method for configuration of robots to execute an activity, in accordance with an embodiment of the disclosure.

FIG. 9 is a diagram that illustrates a flowchart of a second exemplary method for configuration of robots to execute an activity, in accordance with an embodiment of the disclosure. FIG. 9 is explained in conjunction with elements from FIG. 1, FIG. 2, FIG. 3, FIG. 4, FIG. 5, FIG. 6, FIG. 7, and FIG. 8. With reference to FIG. 9, there is shown a flowchart 900. The operations of the exemplary method may be executed by any computing system, for example, by the computer 102 of FIG. 1 or the computer system 202 of FIG. 2. The operations of the flowchart 900 may start at 902.

At 902, the activity data 206A associated with at least one activity 204A to be executed in an activity area 204 is received. In an embodiment, the computer system 202 receives the activity data 206A associated with at least one activity 204A to be executed in an activity area 204. Details about receiving the activity data 206A are provided in the description of FIG. 3.

At 904, the plurality of activity parameters 206B associated with the at least one activity 204A is determined based on the activity data 206A. In an embodiment, the computer system 202 determines the plurality of activity parameters 206B associated with the at least one activity 204A based on the activity data 206A. Details about determining the plurality of activity parameters 206B are provided in the description of FIG. 3.

At 906, the one or more robotic parameters 206C associated with each robot of the plurality of robots 208 is obtained. In an embodiment, the computer system 202 obtains the one or more robotic parameters 206C associated with each robot of the plurality of robots 208. Details about obtaining the one or more robotic parameters 206C are provided in the description of FIG. 3.

At 908, the set of robots 210 is selected from the plurality of robots 208 based on the plurality of activity parameters 206B and the one or more robotic parameters 206C. In an embodiment, the computer system 202 selects the set of robots 210 from the plurality of robots 208 based on the plurality of activity parameters 206B and the one or more robotic parameters 206C. Details about selecting the set of robots 210 are provided in the description of FIG. 3.

At 910, the one or more vulnerabilities 212 associated with an execution of the at least one activity 204A by the set of robots 210 are predicted. The one or more vulnerabilities 212 are predicted based on the plurality of activity parameters 206B and the one or more robotic parameters 206C. In an embodiment, the computer system 202 predicts the one or more vulnerabilities 212 associated with an execution of the at least one activity 204A by the set of robots 210. The one or more vulnerabilities 212 are predicted based on the plurality of activity parameters 206B and the one or more robotic parameters 206C. Details about predicting the one or more vulnerabilities 212 are provided in the description of FIG. 3.

At 912, the one or more modifications 214 are determined based on the one or more vulnerabilities 212. The one or more modifications 214 are performed in the set of robots 210. In an embodiment, the computer system 202 determines the one or more modifications 214 based on the one or more vulnerabilities 212. The one or more modifications 214 are performed in the set of robots 210. Details about determining the one or more modifications 214 are provided in the description of FIG. 3.

At 914, the modification command 216 indicative of the one or more modifications 214 to be performed by the set of robots 210 is executed. In an embodiment, the computer system 202 executes the modification command 216 indicative of the one or more modifications 214 to be performed by the set of robots 210. Details about executing the modification command 216 are provided in the description of FIG. 3.

At 916, the one or more modifications 214 in the set of robots 210 are controlled based on the modification command 216. In an embodiment, the computer system 202 controls the one or more modifications 214 in the set of robots 210 based on the modification command 216. Details about controlling the one or more modifications 214 are provided in the description of FIG. 3.

At 918, the modified set of robots 210A is configured to execute the at least one activity 204A. In an embodiment, the computer system 202 configures the modified set of robots 210A to execute the at least one activity 204A. Details about configuring the modified set of robots 210A are provided in the description of FIG. 3.

At 920, the modified set of robots 210A is controlled based on the configuration of the modified set of robots 210A. The modified set of robots 210A is controlled to execute the at least one activity 204A. In an embodiment, the computer system 202 controls the modified set of robots 210A based on the configuration of the modified set of robots 210A. The modified set of robots 210A is controlled to execute the at least one activity 204A. Details about controlling the modified set of robots 210A are provided in the description of FIG. 3.

The descriptions of the various embodiments of the disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable people of ordinary skill in the art to understand the embodiments disclosed herein.

What is claimed is:

1. A computer-implemented method, comprising:

receiving, by a computer, activity data associated with at least one activity to be executed in an activity area;

determining, by the computer, a plurality of activity parameters associated with the at least one activity based on the activity data;

obtaining, by the computer, one or more robotic parameters associated with each robot of a plurality of robots;

selecting, by the computer, a set of robots from the plurality of robots based on the plurality of activity parameters and the one or more robotic parameters;

predicting, by the computer, one or more vulnerabilities associated with an execution of the at least one activity by the set of robots, wherein the one or more vulnerabilities are predicted based on the one or more robotic parameters and the plurality of activity parameters;

determining, by the computer, one or more modifications based on the one or more vulnerabilities, wherein the one or more modifications are performed in the set of robots;

generating, by the computer, a modification command indicative of the one or more modifications to be performed by the set of robots;

controlling, by the computer, the one or more modifications in the set of robots based on the generated modification command;

configuring, by the computer, the modified set of robots to execute the at least one activity; and controlling, by the computer, the modified set of robots based on the configuration of the modified set of robots, wherein the modified set of robots is controlled to execute the at least one activity.

2. The computer-implemented method of claim 1, further comprising:

controlling, by the computer, one or more sensors to capture the activity data associated with the activity area; and receiving, by the computer, the activity data associated with the activity area from the one or more sensors.

3. The computer-implemented method of claim 2, wherein the activity data comprises at least one of surface data associated with a surface of the activity area, activity specification data associated with the at least one activity, or environmental data associated with an environment of the activity area.

4. The computer-implemented method of claim 1, further comprising:

applying, by the computer, a first artificial intelligence (AI) model to the plurality of activity parameters and the one or more robotic parameters to generate a virtual representation of the plurality of robots;

simulating, by the computer, the virtual representation of the plurality of robots; and generating, by the computer, a simulation result based on the simulation of the virtual representation of the plurality of robots.

5. The computer-implemented method of claim 4, further comprising selecting, by the computer, the set of robots based on the simulation result, wherein the simulation result indicates that the set of robots executes the at least one activity in the activity area.

6. The computer-implemented method of claim 4, further comprising:

generating, by the computer, a fabrication command based on the simulation result, wherein the fabrication command indicates a fabrication of a custom robot different from the plurality of robots;

controlling, by the computer, a fabrication unit to fabricate the custom robot, wherein the fabrication unit is controlled based on the fabrication command, and wherein the custom robot and the set of robots executes the at least one activity in the activity area; and configuring, by the computer, the custom robot and the set of robots to execute the at least one activity.

7. The computer-implemented method of claim 1, further comprising:

applying, by the computer, a second AI model to the one or more robotic parameters associated with each robot of the modified set of robots to determine one or more coupling parameters; and generating, by the computer, a coupling command indicative of the configuration of the modified set of robots based on the determined one or more coupling parameters.

8. The computer-implemented method of claim 7, wherein the one or more coupling parameters comprise at least one of a degree of freedom of each robot of the modified set of robots, a type of movement of each robot of the modified set of robots, a range of motion in each joint of each robot of the modified set of robots, a flexibility in each joint of each robot of the modified set of robots, a position of each effector of each robot of the modified set of robots, or an orientation of each effector of each robot of the modified set of robots.

9. The computer-implemented method of claim 7, further comprising:

applying, by the computer, a third AI model to the one or more robotic parameters associated with each robot of the modified set of robots to determine a trajectory for the modified set of robots;

generating, by the computer, a trajectory command for the modified set of robots based on the determined trajectory, wherein the trajectory command instructs the modified set of robots to follow the trajectory to execute the at least one activity; and transmitting, by the computer, the trajectory command to the modified set of robots.

10. The computer-implemented method of claim 1, further comprising:

identifying, by the computer, one or more robots from the set of robots based on the one or more vulnerabilities;

determining, by the computer, the one or more modifications to be performed in the one or more robots for resolving the one or more vulnerabilities; and generating, by the computer, the modification command for a modification of the one or more robots based on the determined one or more modifications.

11. The computer-implemented method of claim 10, further comprising:

controlling, by the computer, a fabrication unit based on the modification command to modify the one or more robots, wherein the modification of the one or more robots corresponds to an inclusion of a portion of robotic material to at least one robot of the one or more robots; and outputting, by the computer, the modified one or more robots based on the control of the fabrication unit.

12. The computer-implemented method of claim 10, further comprising:

controlling, by the computer, a fabrication unit based on the modification command to modify the one or more robots, wherein the modification of the one or more robots corresponds to a removal of a portion of robotic material from at least one robot of the one or more robots; and outputting, by the computer, the modified one or more robots based on the control of the fabrication unit.

13. The computer-implemented method of claim 1, wherein the plurality of activity parameters comprises at least one of a set of entities present within the activity area, a type of activity to be executed by the set of robots in the activity area, a plurality of activity specifications associated with the type of activity to be executed by the set of robots in the activity area, or a set of risk factors associated with the type of activity to be executed by the set of robots in the activity area.

14. The computer-implemented method of claim 1, wherein the one or more robotic parameters comprise at least one of a count of actuators in each robot of the plurality of robots, a type of each actuator in each robot of the plurality of robots, a length of the actuators in each robot of the plurality of robots, a movement direction of the actuators in each robot of the plurality of robots, a count of joints in each robot of the plurality of robots, a type of each joint in each robot of the plurality of robots, a count of sensors in each robot of the plurality of robots, a type of each sensor in each robot of the plurality of robots, a distribution of mass within each robot of the plurality of robots, a count of movable components in each robot of the plurality of robots, or a count of immovable components in each robot of the plurality of robots.

15. A computer system, comprising:
- a processor set;
- one or more computer-readable storage media; and
- program instructions stored on the one or more computer-readable storage media, the program instructions executable by the processor set to cause the processor set to:
  - receive activity data associated with at least one activity to be executed in an activity area;
  - determine a plurality of activity parameters associated with the at least one activity based on the activity data;
  - obtain one or more robotic parameters associated with each robot of a plurality of robots;
  - select a set of robots from the plurality of robots based on the plurality of activity parameters and the one or more robotic parameters;
  - predict one or more vulnerabilities associated with an execution of the at least one activity by the set of robots, wherein the one or more vulnerabilities are predicted based on the one or more robotic parameters and the plurality of activity parameters;
  - determine one or more modifications based on the one or more vulnerabilities, wherein the one or more modifications are performed in the set of robots;
  - execute a modification command indicative of the one or more modifications to be performed by the set of robots;
  - control the one or more modifications in the set of robots based on the executed modification command;
  - configure the modified set of robots to execute the at least one activity; and
  - control the modified set of robots based on the configuration of the modified set of robots, wherein the modified set of robots is controlled to execute the at least one activity.

16. The computer system of claim 15, wherein the program instructions further cause the processor set to:
- apply a first artificial intelligence (AI) model to the plurality of activity parameters and the one or more robotic parameters to execute a virtual representation of the plurality of robots;
- simulate the virtual representation of the plurality of robots; and
- execute a simulation result based on the simulation of the virtual representation of the plurality of robots.

17. The computer system of claim 16, wherein the program instructions further cause the processor set to select the set of robots based on the simulation result, and wherein the simulation result indicates that the set of robots executes the at least one activity in the activity area.

18. The computer system of claim 16, wherein the program instructions further cause the processor set to:
- determine one or more coupling parameters for the modified set of robots based on the application of the first AI model to the one or more robotic parameters; and
- execute a coupling command indicative of the configuration of the modified set of robots based on the determined one or more coupling parameters.

19. The computer system of claim 18, wherein the program instructions further cause the processor set to:
- determine a trajectory for the modified set of robots based on the application of the first AI model to the one or more robotic parameters;
- execute a trajectory command for the modified set of robots based on the determined trajectory, wherein the trajectory command instructs the modified set of robots to follow the trajectory to execute the at least one activity; and
- transmit the trajectory command to the modified set of robots.

20. A computer-program product to control a set of robots, the computer-program product comprising:
- one or more computer-readable storage media; and
- program instructions stored on the one or more computer-readable storage media to perform operations comprising:
  - receiving activity data associated with at least one activity to be executed in an activity area;
  - determining a plurality of activity parameters associated with the at least one activity based on the activity data;
  - obtaining one or more robotic parameters associated with each robot of a plurality of robots;
  - selecting a set of robots from the plurality of robots based on the plurality of activity parameters and the one or more robotic parameters;
  - predicting one or more vulnerabilities associated with an execution of the at least one activity by the set of robots, wherein the one or more vulnerabilities are predicted based on the one or more robotic parameters and the plurality of activity parameters;
  - determining one or more modifications based on the one or more vulnerabilities, wherein the one or more modifications are performed in the set of robots;
  - generating a modification command indicative of the one or more modifications to be performed by the set of robots;
  - controlling the one or more modifications in the set of robots based on the generated modification command;
  - configuring the modified set of robots to execute the at least one activity; and
  - controlling the modified set of robots based on the configuration of the modified set of robots, wherein the modified set of robots is controlled to execute the at least one activity.

* * * * *